US011037876B2

(12) United States Patent
Lin et al.

(10) Patent No.: US 11,037,876 B2
(45) Date of Patent: Jun. 15, 2021

(54) POWER NETWORK AND METHOD FOR ROUTING POWER NETWORK

(71) Applicant: Shanghai Zhaoxin Semiconductor Co., Ltd., Shanghai (CN)

(72) Inventors: Jerming Lin, Shanghai (CN); Lei Sun, Shanghai (CN); Bing Li, Shanghai (CN)

(73) Assignee: SHANGHAI ZHAOXIN SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 16/812,498

(22) Filed: Mar. 9, 2020

(65) Prior Publication Data
US 2020/0211963 A1 Jul. 2, 2020

Related U.S. Application Data

(62) Division of application No. 16/162,449, filed on Oct. 17, 2018, now Pat. No. 10,867,918.

(30) Foreign Application Priority Data

Sep. 7, 2018 (CN) .......................... 201811041795.5

(51) Int. Cl.
*H01L 23/528* (2006.01)
*H01L 23/50* (2006.01)
*H02J 3/14* (2006.01)

(52) U.S. Cl.
CPC .......... *H01L 23/5286* (2013.01); *H01L 23/50* (2013.01); *H02J 3/14* (2013.01)

(58) Field of Classification Search
CPC ...... G06F 1/26; G06F 2119/06; G06F 30/392; G06F 30/367; G06F 30/394; G06F 30/30;
(Continued)

(56) References Cited

U.S. PATENT DOCUMENTS

| 6,928,632 B2 * | 8/2005 | Wachi ...................... G06F 30/39 257/207 |
| 7,477,073 B1 * | 1/2009 | Tuan ................. H03K 19/17736 326/101 |

(Continued)

FOREIGN PATENT DOCUMENTS

| JP | 2014150481 A | * | 8/2014 |
| JP | 20152252 A | * | 1/2015 |

(Continued)

*Primary Examiner* — Helen Rossoshek
(74) *Attorney, Agent, or Firm* — McClure, Qualey & Rodack, LLP

(57) ABSTRACT

A power network includes a plurality of power switch units disposed in a first semiconductor layer, arranged in a plurality of columns along a first direction and a plurality of rows along a second direction. The power switch units in even rows are aligned with a center point of a horizontal space between adjacent two of the power switch units in the same row of the odd rows of the power switch units in the first direction. The power switch units in even columns are aligned with a center point of a vertical space between adjacent two of the power switch units in the same column of the odd columns of the power switch units in the second direction. The power network further includes a plurality of second connecting lines disposed in a fourth semiconductor layer and extending in the second direction.

9 Claims, 16 Drawing Sheets

(58) Field of Classification Search
CPC ... G06F 30/398; H01L 23/50; H01L 23/5286; Y02B 70/3225; Y02B 20/222
See application file for complete search history.

(56) References Cited

U.S. PATENT DOCUMENTS

| | | | | |
|---|---|---|---|---|
| 7,600,208 | B1* | 10/2009 | Sharma | G06F 30/367 |
| | | | | 716/120 |
| 8,026,570 | B2 | 9/2011 | Kanno et al. | |
| 8,549,460 | B2 | 10/2013 | Law et al. | |
| 8,988,140 | B2* | 3/2015 | Graf | G05F 1/46 |
| | | | | 327/540 |
| 9,331,577 | B2* | 5/2016 | Chang | G06F 1/26 |
| 9,437,500 | B1* | 9/2016 | Hong | H01L 27/11546 |
| 9,594,412 | B2* | 3/2017 | Svilan | G06F 1/3203 |
| 9,620,233 | B1* | 4/2017 | Dong | G11C 7/04 |
| 9,712,164 | B2* | 7/2017 | Momiyama | H03K 19/0013 |
| 2015/0149794 | A1* | 5/2015 | Zelikson | H03K 17/687 |
| | | | | 713/300 |
| 2015/0162448 | A1* | 6/2015 | Raghavan | H01L 23/525 |
| | | | | 257/43 |
| 2015/0365089 | A1 | 12/2015 | Momiyama | |

FOREIGN PATENT DOCUMENTS

| | | |
|---|---|---|
| TW | 201103116 A | 1/2011 |
| TW | 201830650 A | 8/2018 |

* cited by examiner

POWER NETWORK AND METHOD FOR ROUTING POWER NETWORK

CROSS REFERENCE TO RELATED APPLICATIONS

This Application is a Divisional of U.S. application Ser. No. 16/162,449, filed on Oct. 17, 2018, now U.S. Pat. No. 10,867,918, which claims priority of claims priority of China Patent Application No. 201811041795.5, filed on Sep. 7, 2018, the entirety of which is incorporated by reference herein.

BACKGROUND OF THE INVENTION

Field of the Invention

The present disclosure relates to a power network, and in particular, relates to a power network that can reduce the IR-drop (the voltage drop across resistors).

Description of the Related Art

The semiconductor integrated circuit (IC) industry has been experiencing a rapid development. Generally, in the course of integrated circuits' evolution, functional density (i.e., the number of interconnected devices per chip area) has been increasing while geometric size (i.e., the smallest component (or line) that can be created with a fabrication process) has been decreasing. This scaling-down process may increase production efficiency and lower associated costs.

But with functional densities' increasing, the power consumption needed by the integrated circuits' is also increasing. In order to reduce the power consumption, low-power circuit routing of the IC becomes crucial. In a conventional low-power circuit's routing, the power of a power domain of an IC is controlled by adding the power switch units to the IC. The power of an idle power domain is turned off by the power switch units to reduce the excess power consumption caused by leakage current of the IC. However, when the power switch units are added to the IC, the IR-drop of the circuit is usually not considered.

BRIEF SUMMARY OF THE INVENTION

The present disclosure provides a power network. The power network includes a plurality of power switch units, disposed in a first semiconductor layer, arranged in a plurality of columns along a first direction and a plurality of rows along a second direction. The plurality of power switch units in even rows are aligned with a center point of a horizontal space between adjacent two of the plurality of power switch units in the same row of the odd rows of the plurality of power switch units in the first direction. The plurality of power switch units in even columns are aligned with a center point of a vertical space between adjacent two of the plurality of power switch units in the same column of the odd columns of the plurality of power switch units in the second direction. The power network further includes a plurality of second connecting lines, disposed in a fourth semiconductor layer, extending in the second direction, wherein the plurality of second connecting lines are separated by a width of one of the plurality of power switch units, wherein an upper edge and a lower edge of one of the plurality of power switch units are connected to adjacent two of the plurality of second connecting lines, respectively. The first semiconductor layer intersects the fourth semiconductor layer.

The present disclosure provides a method for routing a power network. The method includes the processor reading a first integrated circuit layout in a storage device and then analyzes the first integrated circuit layout to define a power domain. The method further includes disposing a plurality of power switch units in a first semiconductor layer of the power domain. The plurality of power switch units are arranged in a plurality of columns along a first direction and a plurality of rows along a second direction. The plurality of power switch units in even rows are aligned with the center point of a horizontal space between adjacent two of the plurality of power switch units in the same row of the odd rows of the plurality of power switch units in the first direction. The plurality of power switch units in even columns are aligned with the center point of a vertical space between adjacent two of the plurality of power switch units in the same column of the odd columns of the plurality of power switch units in the second direction. The method further includes disposing a plurality of second connecting lines to a fourth semiconductor layer of the power domain by the processor according to the plurality of power switch units, wherein the plurality of second connecting lines are separated by a width of one of the plurality of power switch units. An upper edge and a lower edge of one of the plurality of power switch units are connected to adjacent two of the plurality of second connecting lines, respectively. The first semiconductor layer intersects the fourth semiconductor layer.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1A:
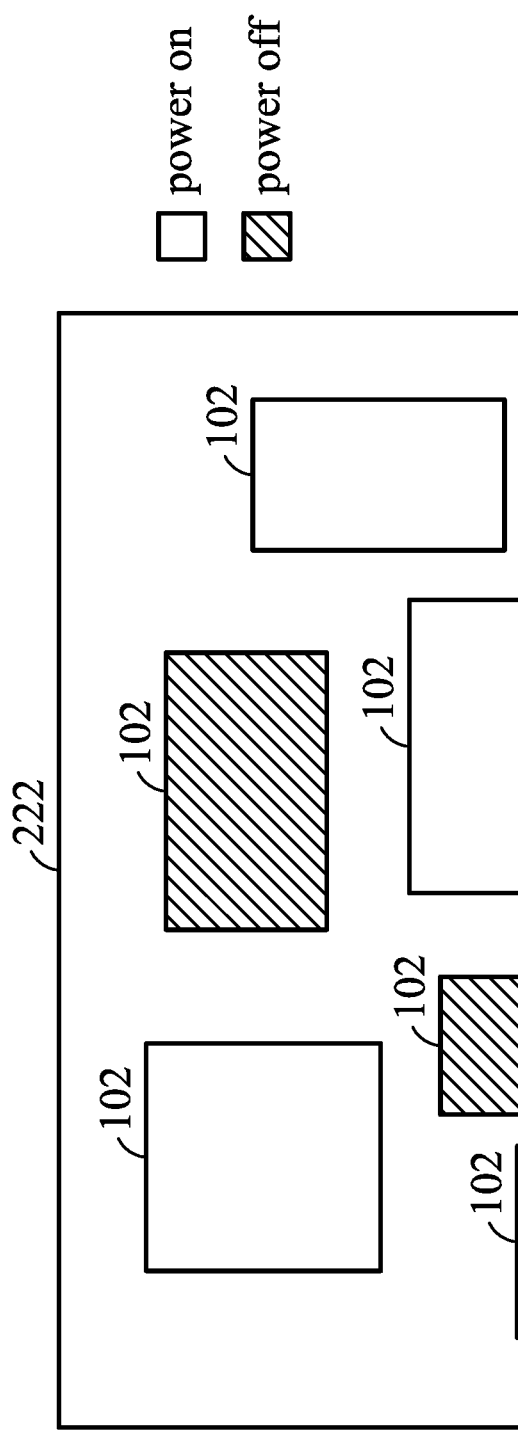
FIG. 1A illustrates a schematic diagram of an integrated circuit layout, in accordance with some embodiments of the present disclosure.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A illustrates a schematic diagram of an integrated circuit layout, in accordance with some embodiments of the present disclosure. A plurality of power domains 102 are defined on an integrated circuit layout 222. In some embodiments, the power domains 102 are respectively disposed in at least one semiconductor layer and a corresponding power network for controlling powers of the power domains 102. For example, when the circuits in some power domains 102 are not used, the powers in these idle power domains 102 will be turned off, and the power of the circuits in the other power domains 102 being used will not be turned off, as shown in FIG. 1A.

Figure 1B:
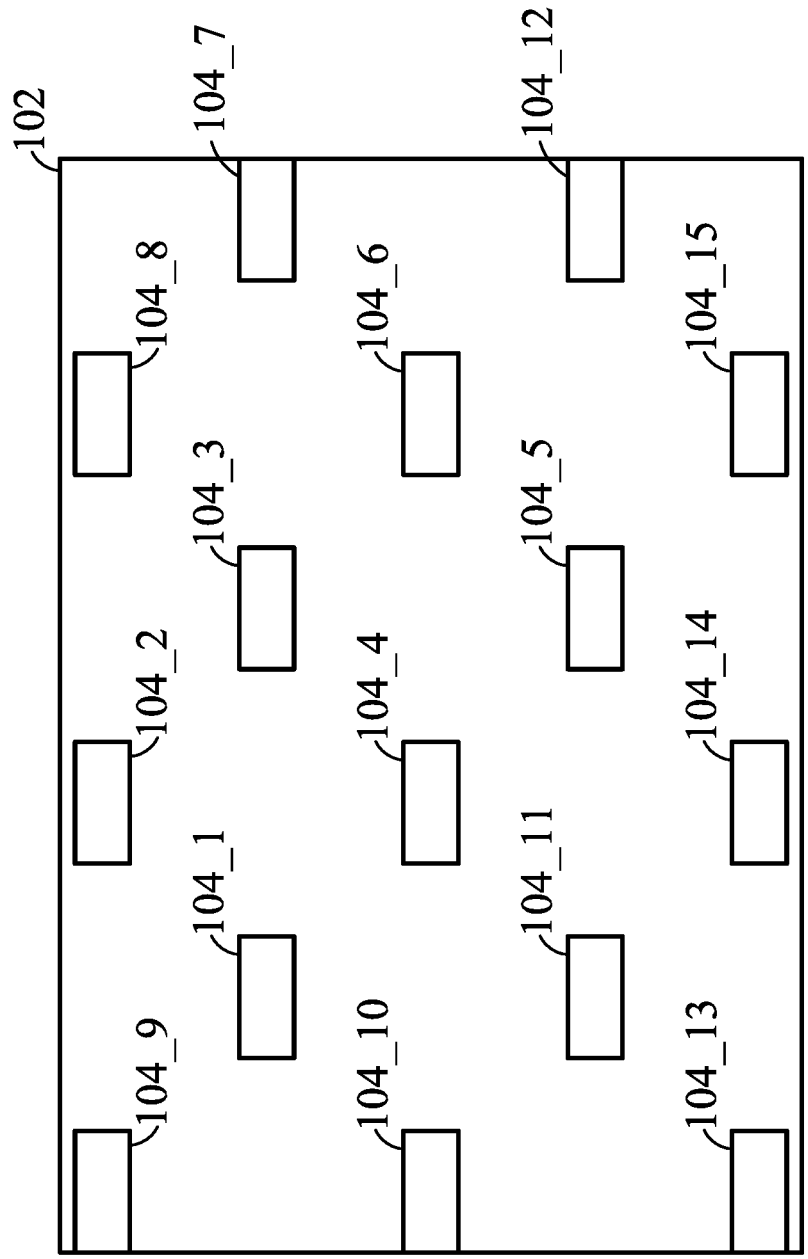
FIG. 1B illustrates a schematic diagram of at least one semiconductor layer of a power domain and the corresponding power switch units in the power domain, in accordance with some embodiments of the present disclosure.

FIG. 1B illustrates a schematic diagram of at least one semiconductor layer of a power domain and the corresponding power switch units in the power domain, in accordance with some embodiments of the present disclosure. As shown in FIG. 1B, a power domain 102 can be disposed with at least one semiconductor layer and a plurality of corresponding power switch units 104_1 to 104_15. In the present embodiment, the power switch units 104_1 to 104_15 may be power shut-off (PSO) devices or power gating devices, and is not intended to limit the present disclosure. The power switch units 104_1 to 104_15 are used to selectively supply power to the connecting lines and standard cells according to the power switch signal (not shown). For example, each of the power switch unit may include a switch. When this switch is turned on or enabled, the connecting lines and standard cells are supplied with power. In contrast, when this switch is turned off or disabled, the connecting lines and standard cells are not supplied with power. In some embodiments, the power switch unit is composed of the active component (e.g., a MOS transistor) or the combination of the active component and the passive component (e.g., a resistor, a capacitor, and/or an inductor), and is not intended to limit the present disclosure. The standard cell may include a logic circuit such as an "AND gate" or a "NOT gate", and/or a functional circuit such as a register or a buffer unit, and is not intended to limit the present disclosure.

In the present embodiment, the power switch units 104_1 to 104_15 are staggered with each other. For example, the power switch units 104_9, 1042, and 104_8 in the first row and the power switch units 104_1, 104_3, and 104_7 in the second row are staggered with each other, the power switch units 104_1, 104_3, and 104_7 in the second row and the power switch units 104_10, 104_4 and 104_6 in the third row are staggered with each other, and so on. The power switch units 104_9, 104_10 and 104_13 in the first column and the power switch units 104_1 and 104_11 in the second column are staggered with each other, the power switch units 104_1 and 104_11 in the second column and the power switch units 1042, 104_4 and 104_14 in the third column are staggered with each other, and so on. In some embodiments, adjacent two of the power switch units in the same column are separated by a vertical space (i.e., the distance in the column direction) and adjacent two of the power switch units in the same row also are separated by a horizontal space (i.e., a distance in the row direction).

In FIG. 1B, two adjacent power switch units in one row and two adjacent power switch units in one column can be regarded as (or form) a rhombus pattern in case that the four power switch units are most closet to the intersection of the one row and the one column. For example, the power switch units 104_1, 104_2, 104_3, and 104_4 form a rhombus. Furthermore, the power switch units 104_3, 104_4 can be combined with the power switch units 104_5, 104_6 to form a new rhombus. Similarly, the power switch unit 104_3 can be combined with the power switch units 104_6, 104_7, 104_8 to form a new rhombus. On this basis, the power switch units 104_1 to 104_15 can form a plurality of rhombuses disposed in the power domain 102. It should be noted that the area, the horizontal axis space and the vertical axis space of each rhombus are the same, wherein the horizontal axis space is the horizontal space of two adjacent power switch units in the horizontal axis of a rhombus, the vertical axis space is the vertical space of another two adjacent power switch units in the vertical axis of the rhombus, and these four power switch units form the rhombus.

In FIG. 1B, the area of each rhombus defined by the power switch units is determined by the utilization rate assigned to the power switch units. The utilization rate further affects the layout of the standard cells. The utilization rate of the power switch units is the ratio of the sum of the areas of all power switch units to the area of the power domain. For example, as shown in FIG. 1B, the power switch unit 104_4 represents a single power switch unit and has an area "a"; the power domain 102 represents a region in which all standard cells and all power switch units are arranged and has an area "A"; the number of power switch units is "N". Therefore, the utilization rate is $s = a \times N/A$. The relationship between the utilization rate "s" and the area Z of a single rhombus (e.g., the area of a rhombus defined by the power switch units 104_1, 1042, 104_3, and 104_4) is Z=a/s. Specifically, in one embodiment, if the area of a single power switch unit 104_4 is 1 μm×2 μm and the utilization rate "s" is 5%, according to the formula s=a×N/A, the area of the power domain assigned to a power switch unit (A/N) is 40 μm². Taking the power switch unit 104_4 shown in FIG. 1B as an example, the power switch unit 104_4 is actually shared by four rhombuses. Specifically, the power switch unit 104_4 is shared by a rhombus defined by the power switch units 104_1, 1042, 104_3, and 104_4, a rhombus defined by the power switch units 104_3, 104_4, 104_5, and 104_6, a rhombus defined by the power switch units 104_4, 104_5, 104_11, and 104_14, and a rhombus defined by the power switch units 104_1, 104_4, 104_11, and 104_10. It can be known that a single rhombus (e.g., a single rhombus defined by the power switch units 104_1, 1042, 104_3 and 104_4) is defined by 4×¼ power switch units. Thus, the area "Z" of a rhombus can be assigned 40 μm² (i.e., the area of the power domain assigned to a power switch unit). Therefore, the area of each rhombus defined by the power switch units is determined by the utilization rate assigned to the power switch units. The layout of the standard cells affected by the utilization rate of the power switch unit will be discussed below.

Figure 1C:
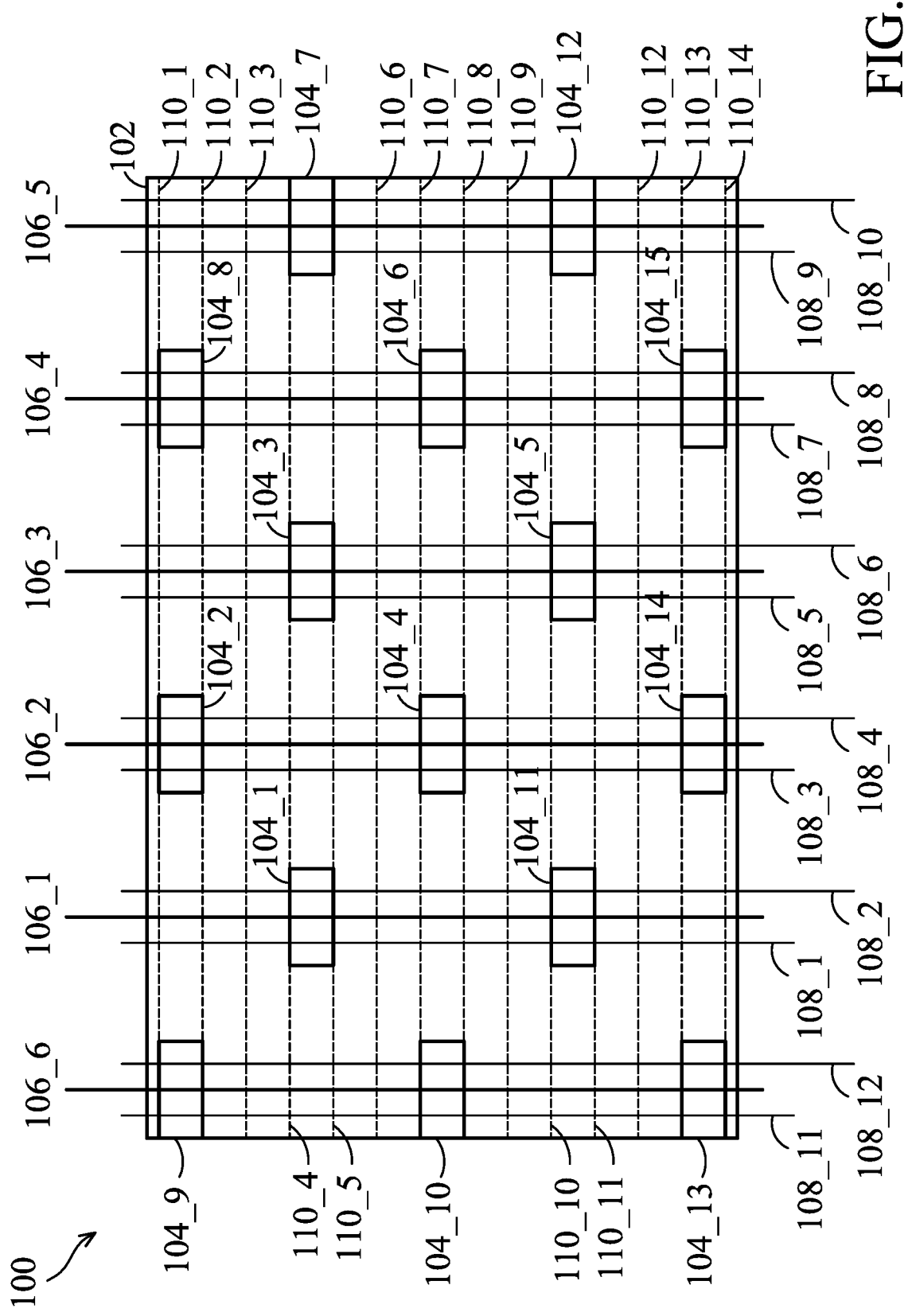
FIGS. 1C, 1C-1 and 1D illustrate a schematic diagram of a power network, in accordance with some embodiments of the present disclosure.
Figures 1, 1C:
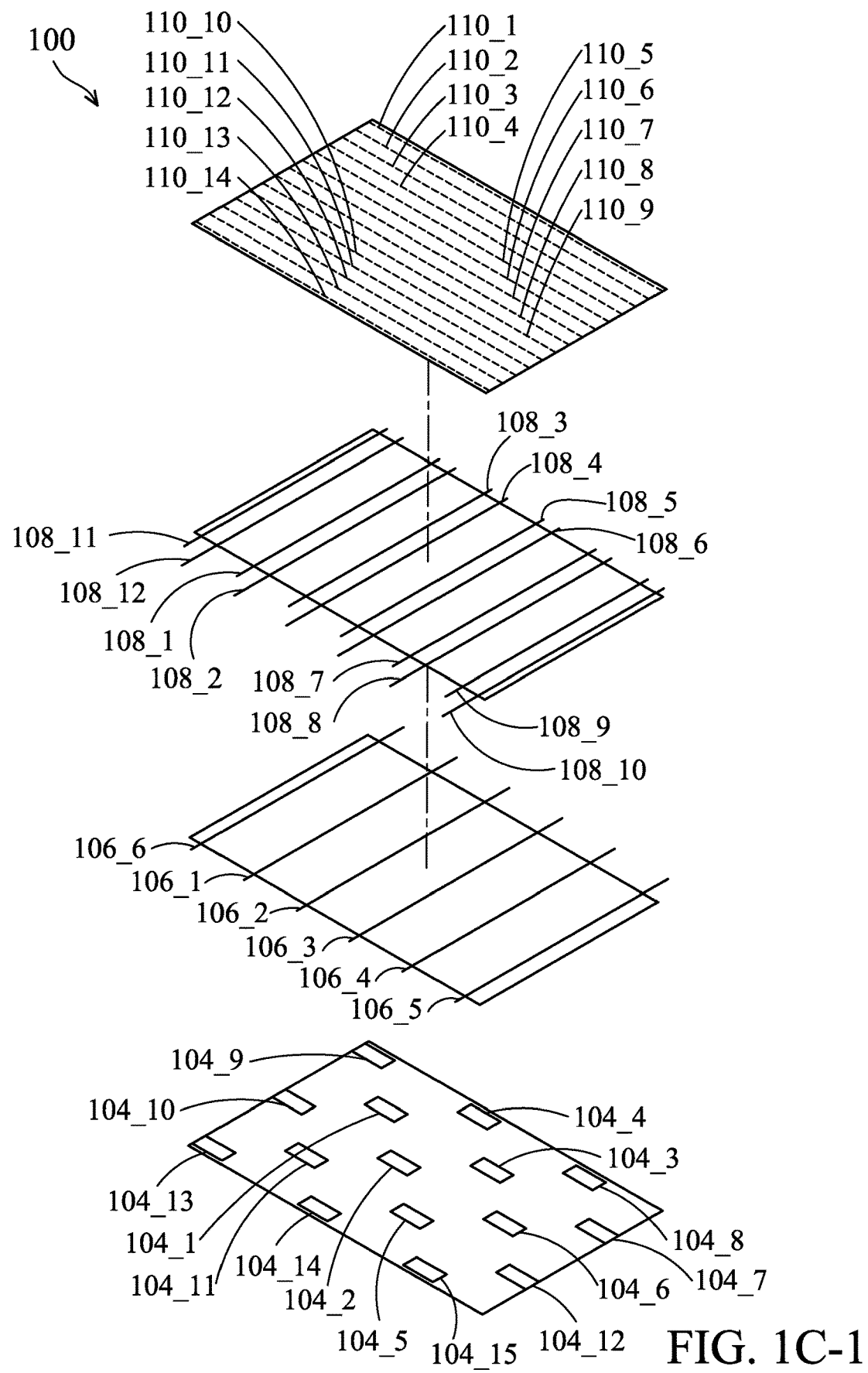

FIG. 1C illustrates a schematic diagram of a power network, in accordance with some embodiments of the present disclosure. As shown in FIG. 1C, the power network 100 on a power domain 102 includes a plurality of power switch units 104_1 to 104_15, a plurality of first power lines 106_1 to 106_6, a plurality of first connecting lines 108_1 to 108_12, and a plurality of second connecting lines 110_1 to 110_14. Although FIG. 1C only shows fifteen power switch units, the power network may include more power switch units. The power switch units 104_1 to 104_15 shown in FIG. 1C may be positioned in a first semiconductor layer, the first power lines 106_1 to 106_6 shown in FIG. 1C may be positioned in a second semiconductor layer, the first connecting lines 108_1 to 108_12 shown in FIG. 1C may be positioned in a third semiconductor layer, and the second connecting lines 110_1 to 110_14 shown in FIG. 1C may be positioned in a fourth semiconductor layer, wherein the first semiconductor layer intersects the fourth semiconductor layer (i.e., the first semiconductor layer may contact with or overlap with the fourth semiconductor layer), and the first power lines 106_1 to 106_6, the first connecting lines 108_1 to 108_12, and the second connecting lines 110_1 to 110_14 are arranged according to the power switch units 104_1 to 104_15.

Specifically, as shown in FIG. 1C, in the intersected first semiconductor layer and the fourth semiconductor layer, the second connecting lines 110_1 to 110_14 are arranged according to the power switch units 104_1 to 104_15. The second connecting lines 110_1 to 110_14 are arranged such that the space (distance) between two adjacent second connection lines 110 is equal to the width of the power switch unit, and whereby the upper edge and the lower edge of each of the power switch units in the same row can be connected to two adjacent second connecting lines, respectively. For example, the upper edges of the power switch units 104_1, 104_3, 104_7 connect to the second connecting line 110_4 and the lower edges of the power switch units 104_1, 104_3, 104_7 connect to the second connecting line 110_5. Therefore, in the intersected first semiconductor layer and the fourth semiconductor layer, each of the power switch units can effectively transmit signals along the second connection lines 110. In another embodiment, the first semiconductor layer is the fourth semiconductor layer. In some embodiments, the power switch units are controlled by the power switch signals from a plurality of signal lines (not shown).

Furthermore, each of the second connecting lines 110 shown in FIG. 1C is also connected to each of the first power lines 106 in the second semiconductor layer and each of the first connecting lines 108 by a plurality of third connecting lines 112 (not shown). Specifically, as shown in FIG. 1C, each of the power switch units in the same column is connected to one of the first power lines 106 in the second semiconductor layer and two of the first connecting lines 108 in the third semiconductor layer through the third connecting lines 112 (not shown). For example, the power switch units 104_1, 104_11 are respectively connected to the first power line 106_1 in the second semiconductor layer and the first connecting lines 108_1, 108_2 in the third semiconductor layer through the third connecting lines 112 (not shown). In most embodiments, each of the first power lines 106 in the second semiconductor layer is arranged in the column direction, so that the first power lines 106 are arranged in parallel to each other and cross over the corresponding column of the power switch units 104. For example, the first power line 106_6 is arranged along the direction of the column formed by the power switch units 104_9, 104_10 and 104_13, and is positioned above the column formed by the power switch units 104_9, 104_10 and 104_13. And the first power line 106_1 is arranged along the direction of the column formed by the power switch units 104_1, 104_11, and is positioned above the column formed by the power switch units 104_1, 104_11. In one preferred embodiment, when the first power line 106 is positioned directly above the column of the corresponding power switch units 104, the length of the third connecting lines 112 (not shown) connecting the power switch units 104_1, 104_11 and the first power line 106_1 in the second semiconductor layer is the shortest. According to other embodiments, each of the first power lines 106 in the second semiconductor layer is arranged like the columns of the power switch units 104, so that the first power lines 106 are arranged in parallel to each other, but they do not cross over the column of the corresponding power switch unit 104. In this case, the length of the third connecting lines 112 (not shown) connecting the power switch units 104_1, 104_11 and the first power line 106_1 in the second semiconductor layer is increased. The first power line 106_6 is parallel to the first power line 106_1, the horizontal axis space between the first power line 106_6 and the adjacent first power line 106_1 is equal to half of the horizontal axis space of a single rhombus. In some embodiments, the first power lines 106 are connected to an actual high potential power source, such as a power source VDD.

In the present embodiment, in the third semiconductor layer, two first connecting lines 108 are respectively arranged in parallel on both sides of each of the first power lines 106 in the second semiconductor layer. For example, the first connecting lines 108_11, 108_12 are respectively arranged in parallel on both sides of the first power lines 106_6. Therefore, the first connecting lines 108 are also arranged along the column direction and are parallel to each other. Furthermore, in the present embodiment, each of the first connecting lines 108 crosses over one corresponding column of the power switch units. In some embodiments, the first connecting lines 108 are connected to a virtual power source.

Figure 1D:
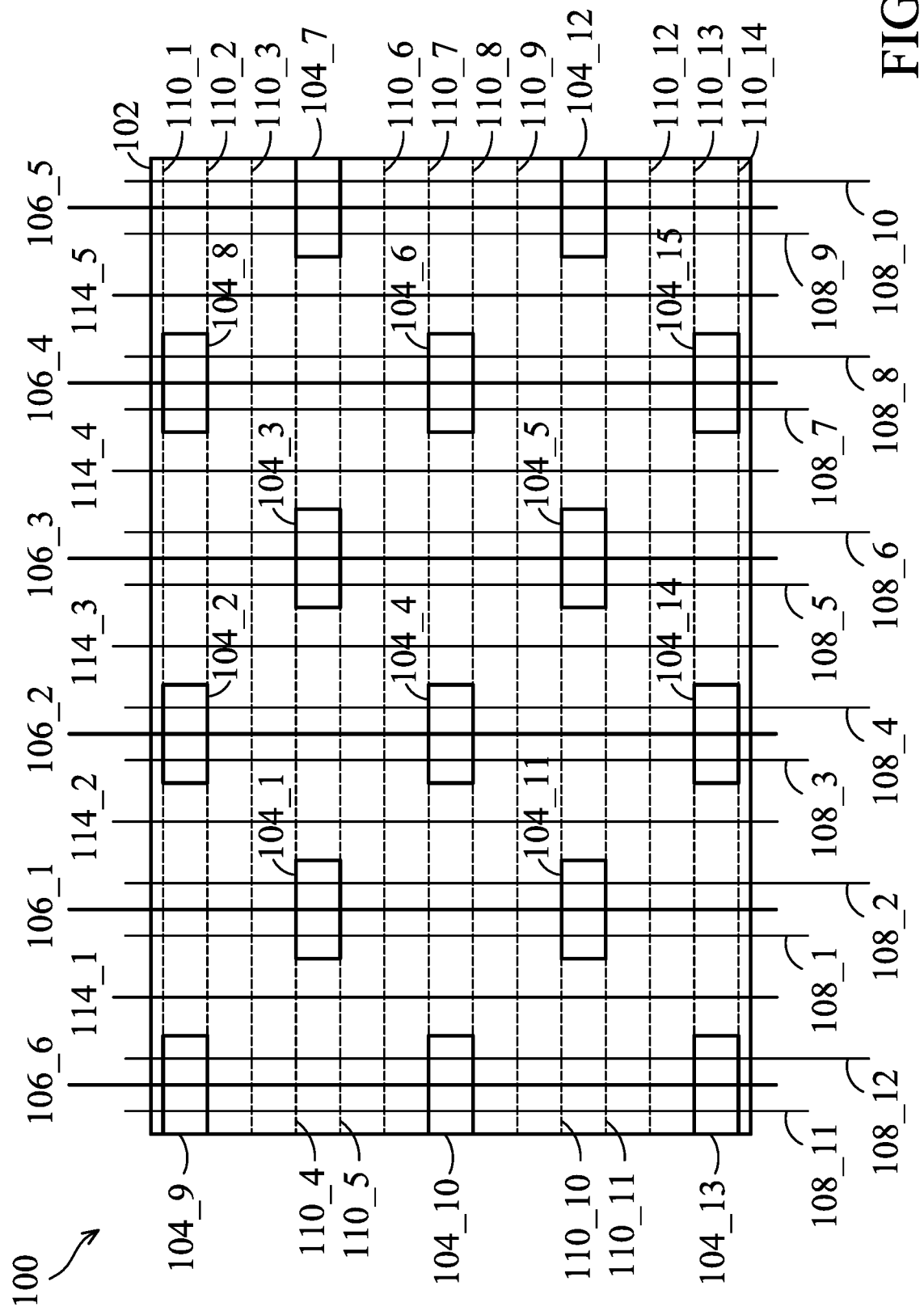

FIG. 1D illustrates a schematic diagram of a power network, in accordance with some embodiments of the present disclosure. The difference between the power network shown in FIG. 1D and the power network shown in FIG. 1C is that the power network shown in FIG. 1D further includes a plurality of second power lines 114 connected to a low potential power source, such as a ground VSS. The second power lines 114 shown in FIG. 1D include the second power lines 114_1 to 114_5. As shown in FIG. 1D, each of the second power lines 114_1 to 114_5 is respectively disposed between every two columns of the power switch units. Each of the standard cells (not shown) in the power domain 102 is connected to at least one second power line 114. In one embodiment, the first power lines 106 and the second power lines 114 are disposed in parallel in the second semiconductor layer and are disposed along the same direction of the vertical axis (i.e., the column direction). The direction of the second connecting lines 110 (i.e., the row direction) is different than the direction of the first power lines 106 (i.e., the column direction), the first connecting lines 108, and the second power lines 114. In some embodiments, the second connecting lines 110 are perpendicular to the first power lines 106, the first connecting lines 108, and the second power lines 114. In some embodiments, the first power lines 106, the first connecting lines 108, the second connecting lines 110, and the second power lines 114 are made of the same material and have the same line width. In one embodiment, the first power lines 106, the first connecting lines 108, the second connecting lines 110, and the second power lines 114 are made of different materials. In one embodiment, the first power lines 106, the first connecting lines 108, the second connecting lines 110, and the second power lines 114 have different line widths. In one embodiment, the second power lines 114 may also be positioned in a fifth semiconductor layer. In the present embodiment, FIG. 1B is a top view of the power domain 102, FIGS. 1C and 1D are top views of the power network 100.

Figure 2:
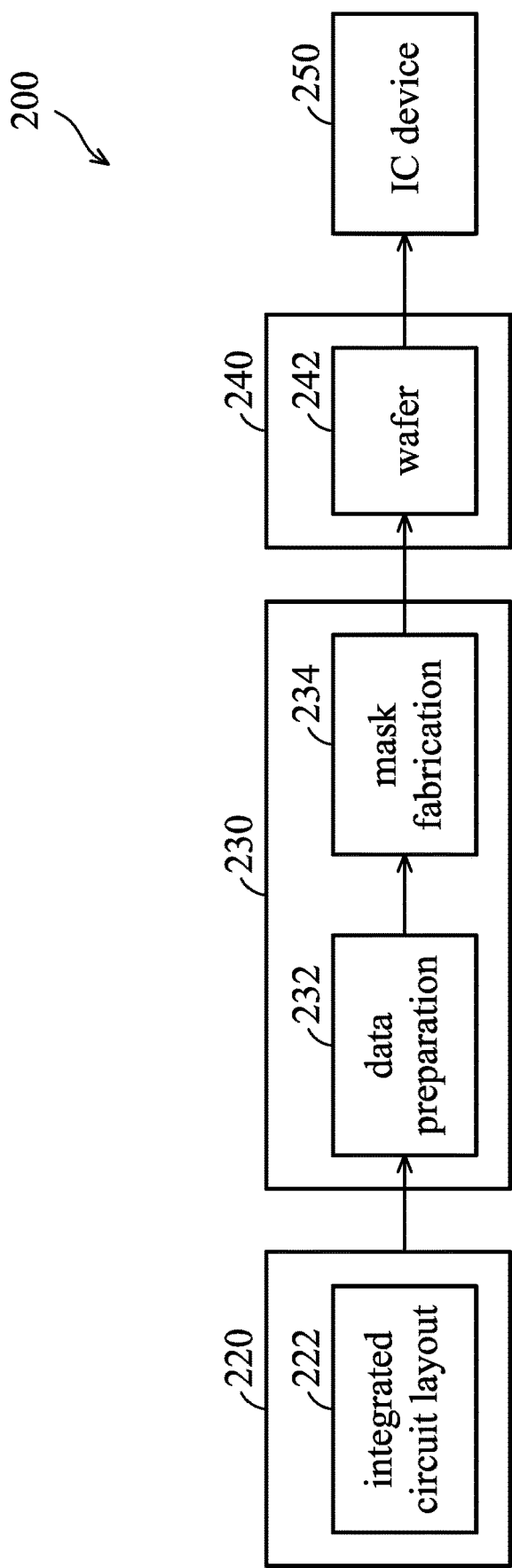
FIG. 2 illustrates a simplified block diagram of an embodiment of an integrated circuit (IC) manufacturing system and related manufacturing flow for manufacturing an IC device having a power network, in accordance with some embodiments of the present disclosure.

FIG. 2 illustrates a simplified block diagram of an embodiment of an integrated circuit (IC) manufacturing system 100 and the related flow for manufacturing an IC device having a power network 100, in accordance with some embodiments of the present disclosure. The IC manufacturing system 200 includes a plurality of entities, such as a design house 220, a mask house 230, and an IC manufacturer (or fab) 240, that interact with one another in the routing, development, and manufacturing cycles and/or services related to manufacturing an integrated circuit (IC) device 250. The plurality of entities are connected by a communications network, which may be a single network or a variety of different networks, such as a private intranet and/or the Internet, and may include wired and/or wireless communication channels. Each entity may interact with other entities and may provide services to and/or receive services from the other entities. One or more of the design house 220, the mask house 230, and the IC manufacturer 240 may be owned by a single company, and may even coexist in a common facility and use common resources.

The design house (or design team) 220 generates the integrated circuit layout (or IC layout) 222. The integrated circuit layout 222 includes various geometrical patterns (e.g., polygons) designed for the IC device 250. The geometrical patterns correspond to IC features in one or more semiconductor layers that constitute the IC device 250. Exemplary IC features include active regions, gate electrodes, source and drain features, isolation features, metal lines, contact plugs, vias, and so on. The design house 220 implements appropriate design procedures to form the integrated circuit layout 222. The design procedures may include logic design, physical design, placing-and-routing, and/or various routing checking operations. The integrated circuit layout 222 is presented in one or more data files having information about the geometrical patterns. For example, the integrated circuit layout 222 can be expressed in a GDSII file format or DFII file format.

Figure 3:
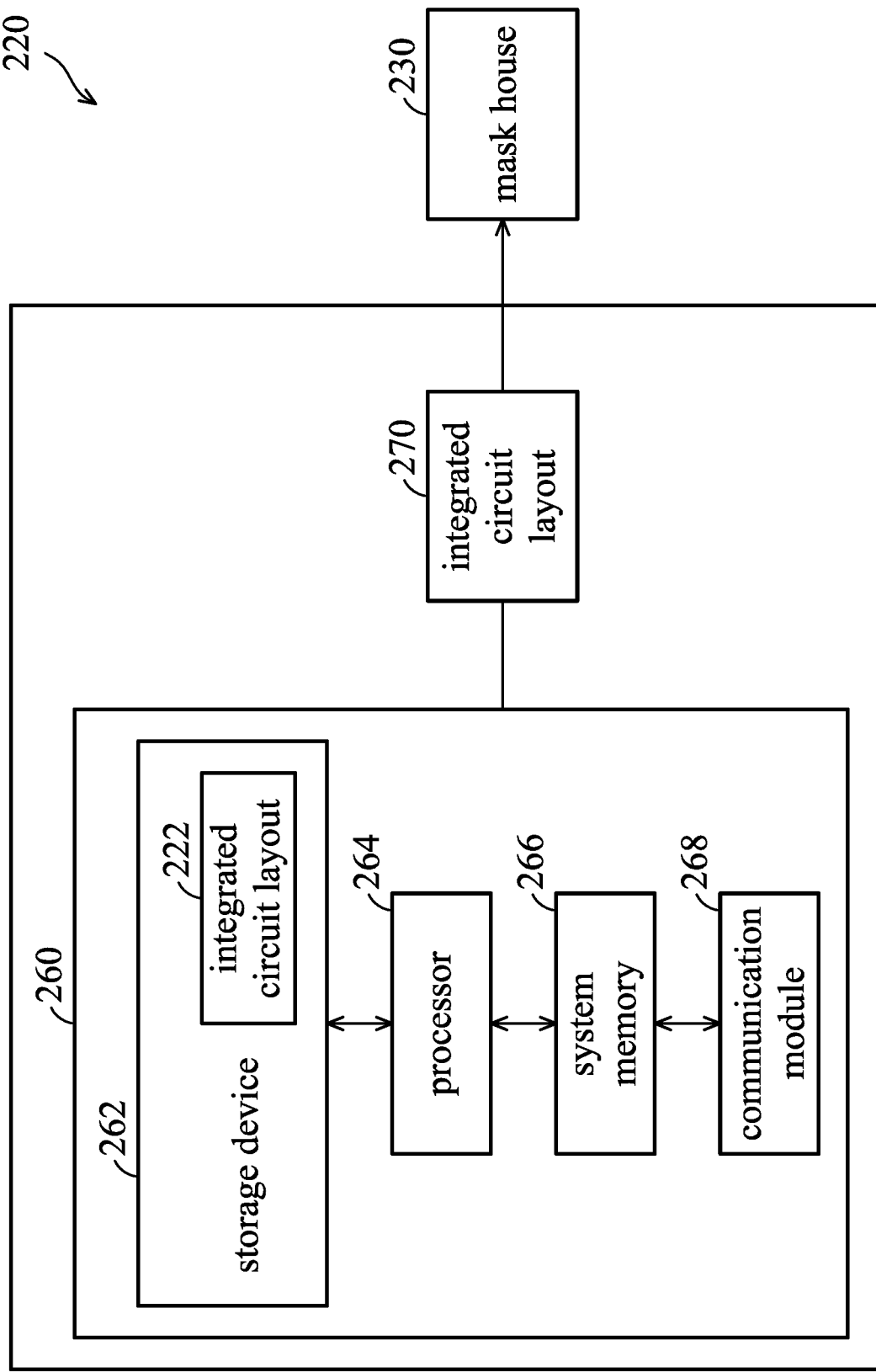
FIG. 3 illustrates a simplified block diagram of a design house for fabricating the power network, in accordance with some embodiments of the present disclosure.

In the present embodiment, the design house 220 performs the routing of the power network 100. As shown in FIG. 3, the design house 220 includes a routing system 260. The routing system 260 is an information handling system such as a computer, server, workstation, or other suitable device. The routing system 260 includes a processor 264 that is communicatively coupled to a system memory 266, a storage device 262, and a communication module 268. The system memory 266 provides non-transitory, computer-readable storage for the processor 264 to execute computer instructions. Examples of system memory may include random access memory (RAM) devices such as dynamic RAM (DRAM), synchronous DRAM (SDRAM), solid state memory devices, and/or a variety of other memory devices known in the art. Computer programs, instructions, and data are stored on the storage device 262. Examples of storage devices may include hard discs, optical disks, magneto-optical discs, solid-state storage devices, and/or a variety of other storage devices known in the art. The communication module 268 is operable to communicate information such as integrated circuit layout files with the other components in the IC manufacturing system 200, such as mask house 230. Examples of communication modules may include Ethernet cards, 802.11 WiFi devices, cellular data radios, and/or other suitable devices known in the art.

In operation, the routing system 260 routes the power network 100 by utilizing the integrated circuit layout 222. The routing system 260 analyzes the integrated circuit layout 222 in the storage device 262 to define the power domains in the IC device 250. The area of the rhombus defined by the four power switch units (e.g., the power switch units 104_1 to 104_4) in the power network 100 is calculated by the utilization rate of the power switch unit, whereby the relationship between the horizontal axis space (distance) of the rhombus and the vertical axis space (distance) of the rhombus is obtained. The power network 100 is then disposed in the power domain and the layout of the power network 100 is derived. The layout of the power network 100 is integrated into the integrated circuit layout 222 to form the integrated circuit layout 270, and then the integrated circuit layout 270 is transmitted to the mask house 230 via the communication module 268 to produce the masks.

The mask house 230 uses the integrated circuit layout 270 to manufacture a set of masks to be used for fabricating the various layers of the IC device 250. The mask house 230 performs data preparation 232 and mask fabrication 234. In the data preparation 232, the integrated circuit layout 270 is translated into a form that can be physically written by a mask writer. In the mask fabrication 234, the set of masks (photomask or reticle) is fabricated.

The data preparation 232 may produce feedback to the design house 220, which may be used to modify (or adjust) the integrated circuit layout 270 to make it compliant for the manufacturing processes in the IC manufacturer 240. The data preparation 232 may further include other manufacturing flows such as optical proximity correction (OPC), off-axis illumination, sub-resolution assist features, other suitable techniques, or combinations thereof.

After the data preparation 232 prepares data for the mask layers, the mask fabrication 234 fabricates a group of masks. For example, an electron-beam (e-beam) or a mechanism of multiple e-beams is used to form a pattern on a mask based on data files derived from the integrated circuit layout 270. The mask can be formed in various technologies such as binary masks, phase shifting masks, and EUV masks. For example, a binary mask includes a transparent substrate (e.g., fused quartz) and an opaque material (e.g., chromium) coated on the substrate. The opaque material is patterned according to the mask data, thereby forming opaque regions and transparent regions on the binary mask. A radiation beam, such as an ultraviolet (UV) beam, is blocked by the opaque regions and transmits through the transparent regions, thereby transferring an image of the mask to a sensitive material layer (e.g., photoresist) coated on a wafer 242. In another example, a EUV mask includes a low thermal expansion substrate, a reflective multilayer (ML) over the substrate, and an absorption layer over the ML. The absorption layer is patterned according to the mask data. A EUV beam is either absorbed by the patterned absorption layer or reflected by the ML, thereby transferring an image of the mask to a sensitive material layer (e.g., photoresist layer) coated on the wafer 242.

The IC manufacturer (fab) 240, such as a semiconductor foundry, uses the masks to fabricate the IC device 250 using, for example, lithography processes. The IC manufacturer 240 is an IC fabrication business that can include a myriad of manufacturing facilities for the fabrication of a variety of different IC products. For example, there may be a manufacturing facility for the front end fabrication of a plurality of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business. In the present embodiment, a semiconductor wafer is manufactured to form the IC device 250 using one or more photolithography processes such as deep ultraviolet (DUV) lithography, immersion lithography, extreme ultraviolet (EUV) lithography, electron beam lithography, x-ray lithography, ion beam lithography, and other suitable lithography techniques.

The wafer 242 includes a silicon substrate or another proper substrate having material layers formed thereon. The materials made of the another proper substrate include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The wafer 242 may further include various doped regions, dielectric features, and multilevel interconnects (formed at subsequent manufacturing steps).

Figure 4:
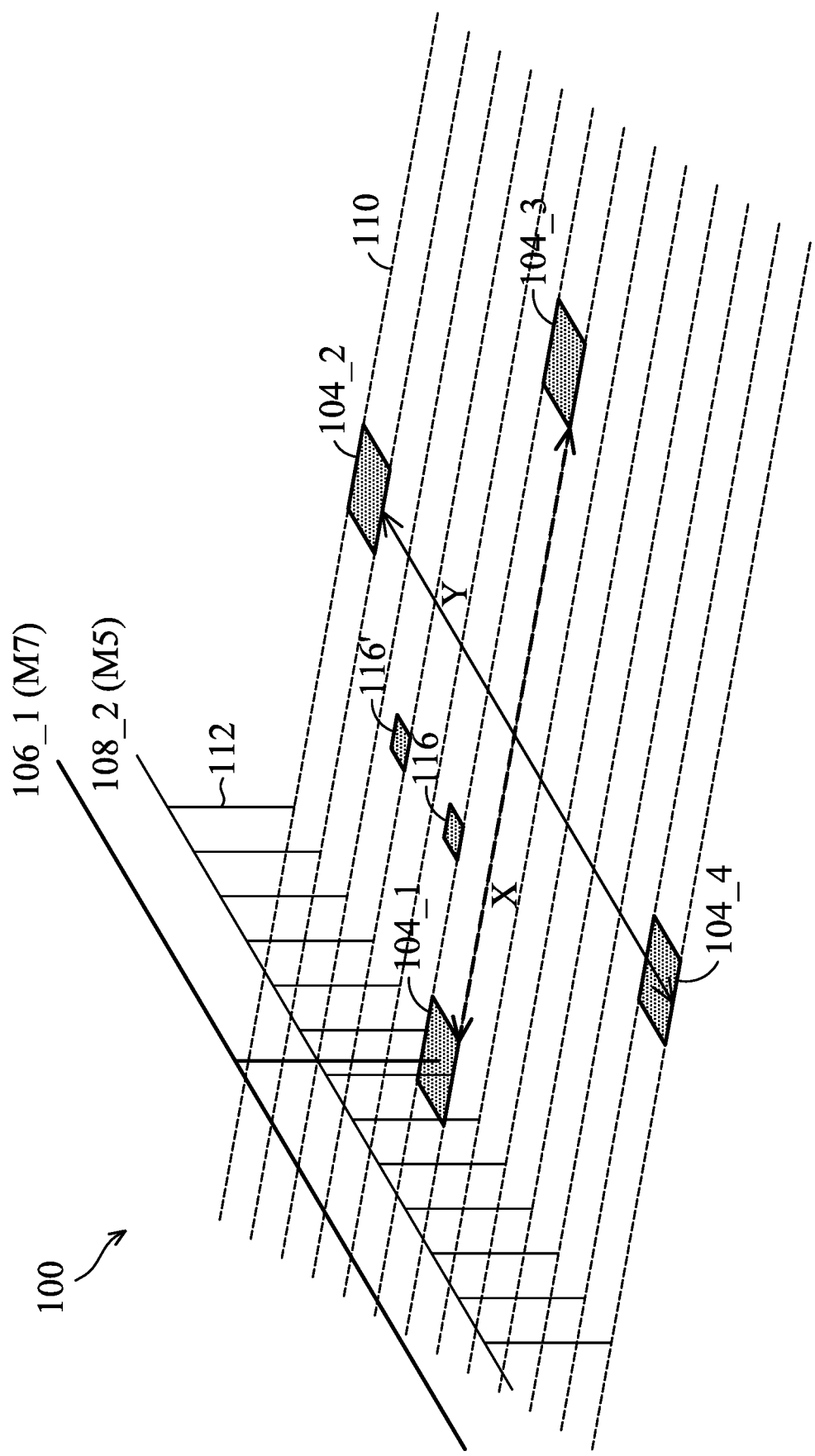
FIG. 4 illustrates a schematic diagram of a portion of the power network, in accordance with some embodiments of the present disclosure.

FIG. 4 illustrates a schematic diagram of a rhombus in the power network, in accordance with some embodiments of the present disclosure. The four power switch units 104_1, 104_2, 104_3, and 104_4 compose (or define) a rhombus. The rhombus has a horizontal axis space X (i.e., the distance between the power switch units 104_1 and 104_3) and a vertical axis space Y (i.e., the distance between the power switch units 104_2 and 104_4). For convenience, only one first power line 106_1 and one first connecting line 1082 connected to each of the second connection lines 110 through the third connecting lines 112 are shown above the power switch unit 104_1. It should be understood that the other power switch units 1042, 104_3, 104_4 also have the first power lines 106, the first connecting lines 108, the second connecting lines 110, and the third connecting lines 112, as shown in FIG. 1C.

As shown in FIG. 4, the first power lines 106 supply power to the power switch units 104_1, 1042, 104_3, and 104_4. When the power switch units 104_1, 1042, 104_3, and 104_4 are turned on or enabled, the first power lines 106 are electrically connected to the second connecting lines 110, the third connecting lines 112, and the first connecting lines 108. Therefore, the power switch units 104_1, 1042, 104_3, and 104_4 can supply power to the standard cells 116 and 116' through the first connecting lines 108 and/or the second connecting lines 110 (the standard cells 116 and 116' are respectively connected to at least one second connecting Line 110). For example, the standard cell 116's power may be directly supplied by the power switch unit 104_1 through one second connecting line 110. Alternatively, the standard cell 116's power may be supplied by the power switch unit 1042 through one second connection line 110, one third connecting line 112, one first connection line 108, and the other third connecting line 112 connected to the power switch unit 104_2. In another example, the standard cell 116's power is supplied by the power switch unit 104_1 or 104_2 through one second connecting line 110, one third connecting line 112, one first connecting line 108, and another third connecting line 112.

It should be noted that the position of each component of the power network is merely exemplary, and is not intended to limit the present disclosure. In some embodiments, the first power lines 106, the first connecting lines 108, and the second connecting lines 110 are in different level of semiconductor layers. The level of the semiconductor layer where the first power lines 106 are positioned is higher than the level of the semiconductor layer where the first connecting lines 108 are positioned, the level of the semiconductor layer where the first connecting lines 108 are positioned is higher than the level of the semiconductor layer where the second connecting lines 110 are positioned, and the power switch units and the standard cells are positioned in the substrate below these semiconductor layers, and is not intended to limit the present disclosure. In some embodiments, each of the third connecting lines 112 includes a combination of vias between different semiconductor layers, and is not intended to limit the present disclosure. In the present embodiment, the first power lines 106 are in the second (The level 7 or M7) semiconductor layer, the first connecting lines 108 are in the third (level 5 or M5) semiconductor layer, and the second connecting lines 110 are in the fourth (level 2 or M2) semiconductor layer, and each of the third connecting lines 112 comprise a combination of the second via to the fourth via (via2-via4). In other embodiments, the first connecting lines 108 and the first power lines 106 can be in the same level of semiconductor layers.

As discussed above, the area of the rhombus defined by the four power switch units can be determined by the utilization rate of the power switch unit. For example, the present embodiment can be applied to the power switch unit in a 16 nm fabrication process, and is not intended to limit the present disclosure. In case of the area of the rhombus is predetermined, the different horizontal axis space of the rhombus will result in different circuit resistances for the optimal circuit path between the corresponding standard cell and the power switch unit. That is, the circuit path between the standard cell and the power switch unit in the rhombus formed by the four power switch units may have different IR-drop. In the present embodiment, the target rhombus is obtained by a formula of the horizontal axis space of the rhombic, so that the circuit path in the target rhombus has the optimal (smallest) IR-drop.

In the present embodiment, the area of the rhombic obtained based on the utilization rate of the power switch unit (as discussed above) and the sheet resistance of the first connecting line 108 and the second connecting line 110 obtained according to the metal material can be substituted for the formula (1) below:

$$d = (Ab/a)^{1/2} \qquad \text{formula (1)}$$

wherein:
"A" is half of the area of the rhombus,
"a" is the sheet resistance of the second connecting lines 110,
"b" is the sheet resistance of the first connecting lines 108, and
"d" is half of the horizontal axis space of the rhombus.

With the above formula (1), the horizontal axis space "X" (X=2d) of the target rhombus can be obtained to guide the subsequent routing of the first power lines 106, the first connecting lines 108, the second connecting lines 110, and the second power lines 114. The circuit path between the standard cell and the power switch unit in the target rhombus calculated by the formula (1) has the optimal (smallest) IR-drop. The derivation of formula (1) is described below.

Figure 5:
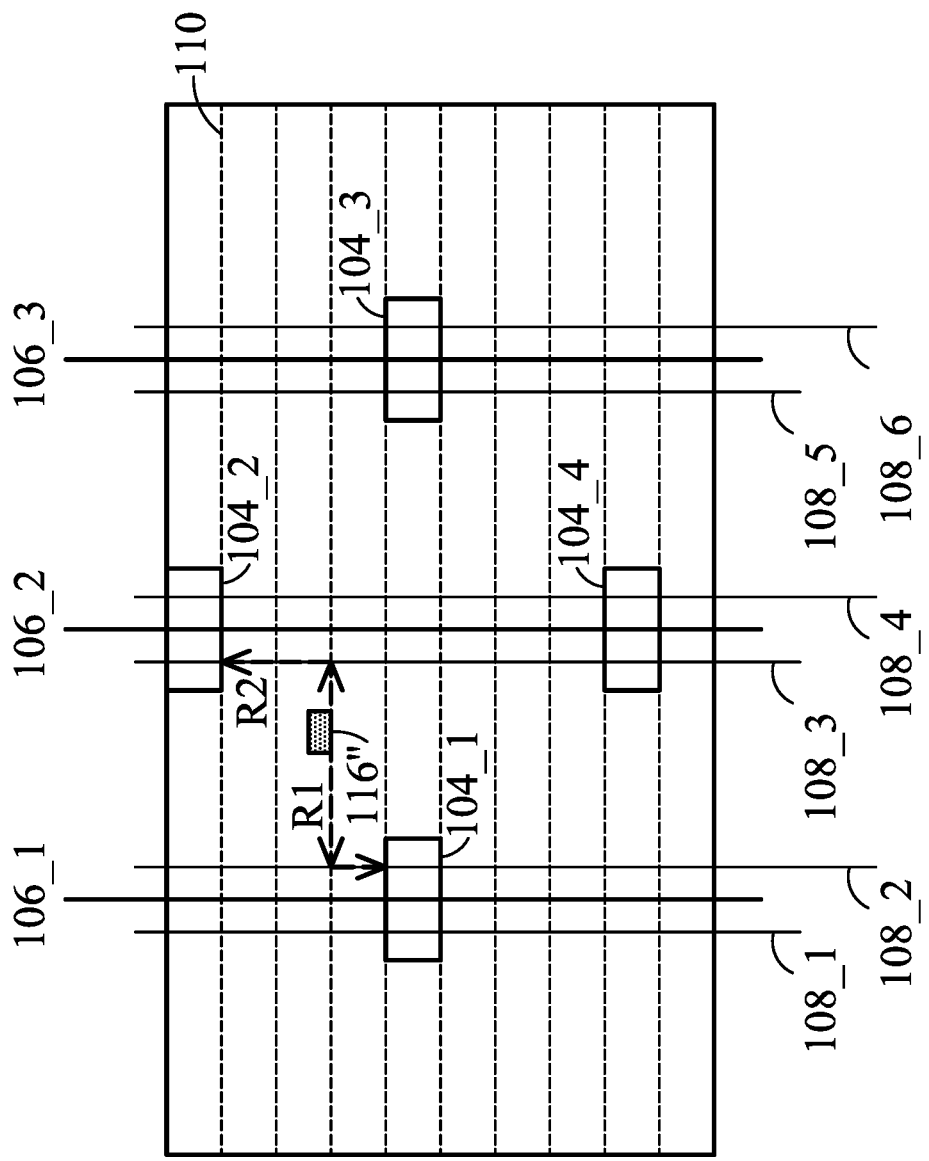
FIG. 5 illustrates a schematic diagram of a portion of the power network, in accordance with some embodiments of the present disclosure.

In order to analyze the horizontal axis space X of the target rhombus having the optimal (smallest) IR-drop, it is necessary to analyze the case that the largest resistance of the circuit path from standard cell to the power switch unit in the rhombus. As shown in FIG. 5, the circuit path from the standard cell 116" to the power switch unit 104_1 in the rhombus (referred to as path 1) has a resistance R1; the circuit path from the standard cell 116" to the power switch unit 104_2 in the rhombus (referred to as path 2) has a resistance R2. When the position of the standard unit 116" in the rhombus is different such that the lengths of the path 1 and the path 2 are different (i.e., the resistance R1 is not equal to the resistance R2), the path having smaller length in path 1 and path 2 is an effective path for the standard unit 116" to be supplied power from the power switching unit. In this case, the circuit resistance of the standard unit 116" in the rhombus is not maximal because there is a shorter path. Therefore, when the circuit resistance from the standard cell to the two adjacent power switch units is equal in the rhombus, this circuit resistance is the maximum circuit resistance of the standard cell in the rhombus. As discussed above, in a condition that the area of the rhombus is fixed, the rhombus with different horizontal axis space has different maximum circuit resistance. The rhombus having the smallest maximum circuit resistance is the rhombus having the smallest (optimal) IR-drop.

In order to derive the formula (1), the subsequent embodiments is discussed below. In the subsequent embodiments, the utilization rate of the power switch unit is predetermined 5%, so that the area of the rhombus is 69.12 μm² and the half of the area of the rhombus is 34.56 μm², according to the formula s=a×N/A discussed above. The width B of each power switch unit is predetermined as 1.152 μm, so that the space of the adjacent two second connecting lines 110 is also 1.152 μm. The sheet resistance of the second connecting line 110 is "a", the sheet resistance of the first connecting line 108 is constant "b", and the resistance of the third connecting line 112 is "c". The resistance of the signal line that controls the power switch unit and the internal circuit resistance of the power switch unit are not considered because the effect on the overall circuit resistance is small.

Figure 6:
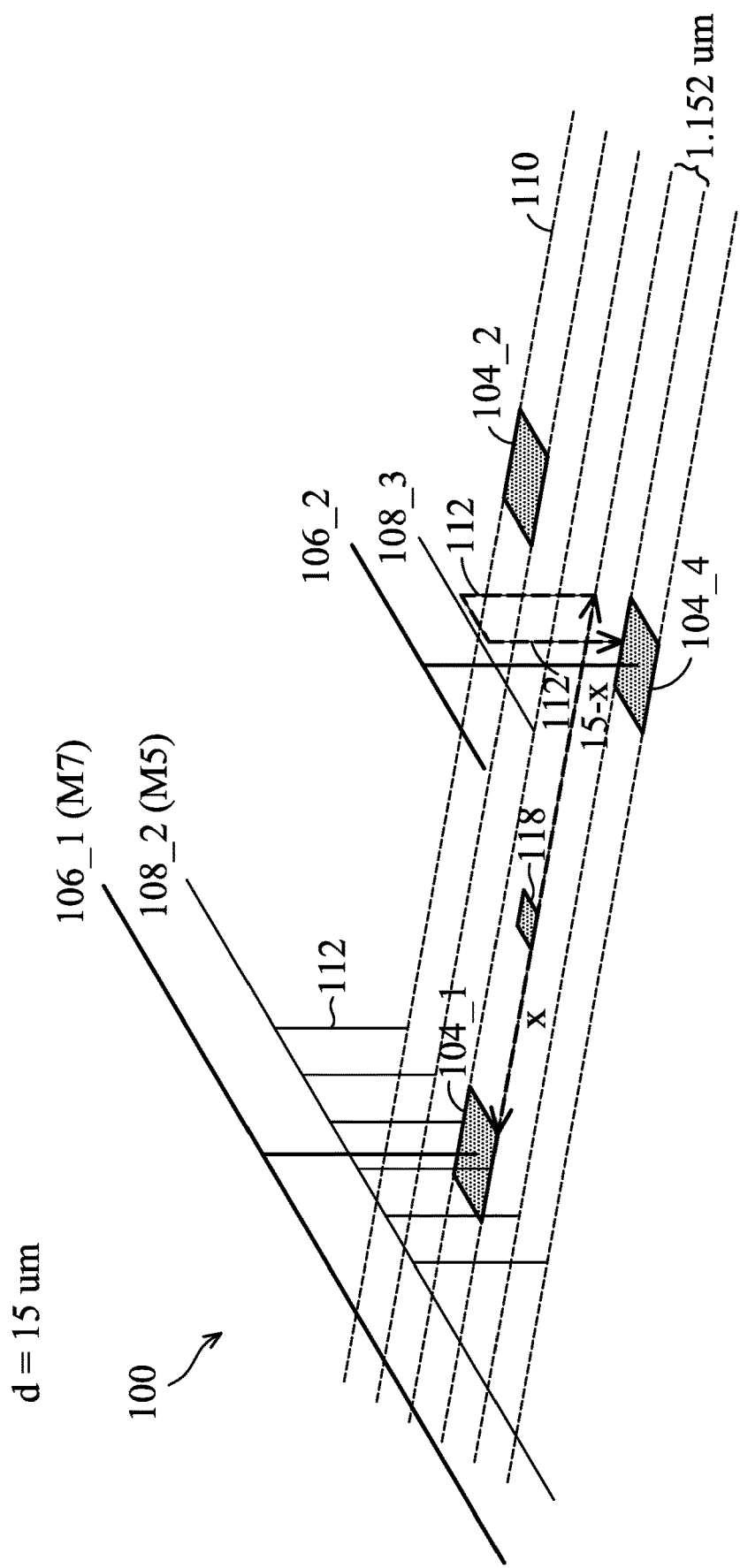
FIG. 6 illustrates a schematic diagram of a portion of the power network, in accordance with some embodiments of the present disclosure.

Furthermore, the variables of subsequent embodiments are discussed below. In the rhombus, the distance from the standard unit to the left power switch unit (e.g., the power switch unit 104_1 in FIGS. 5 to 8C) is denoted as "x" (hereinafter "x"). Half of the horizontal axis space of the rhombus is denoted as "d" (hereinafter "d"). The present disclosure takes three disclosed embodiments below to compare and summarize the maximum circuit resistance of the variable "x" for different values of "d". FIG. 6 illustrates a schematic diagram of a power network in which "d" is 15 μm, in accordance with some embodiments of the present disclosure. In this embodiment, as discussed above, if the area of the single rhombus is 69.12 μm², the vertical axis space of the rhombus is 4.608 μm according to the formula of the rhombus area Z=the vertical axis space×d. This vertical axis space (4.608 μm) is equal to four times the space of adjacent two second connecting lines 110 (4×1.152 μm). For convenience, the power network 100 in FIG. 6 merely shows the standard cell 118, the three power switch units 104_1, 1042, and 104_4 and merely shows a portion of the first power lines 106_1 and 1062, the first connecting lines 108_2 and 108_3, the second connecting line 110, and the third connecting line 112 (the same as the subsequent FIGS. 7A to 8C).

As shown in FIG. 6, the two power switch units 104_1 and 104_4 are adjacent to the standard cell 118. The resistance from the standard cell 118 to the power switch unit 104_1 is R1, and the resistance from the standard cell 118 to the power switch unit 104_4 is R2, wherein:

$$R1 = ax$$

is the resistance from the standard cell 118 through the left connecting line 110 to the power switch unit 104_1;

$$R2 = (15-x)a + 1.152b + 2c$$

is the resistance from the standard cell 118 through the right second connecting line 110, one third connecting line 112, the first connecting line 108_3, and the other third connecting line 112 to the power switch unit 104_4;

wherein:
"a" is the sheet resistance of the second connecting lines 110,
"b" is the sheet resistance of the first connecting lines 108, and
"c" is the resistance of the third connecting line 112.

When R1=R2, that is, when ax=(15−x)a+1.152b+2c, the maximum circuit resistance (Rmax) is:

$$R\text{max} = 7.5a + 0.576b + c$$

Figure 7A:
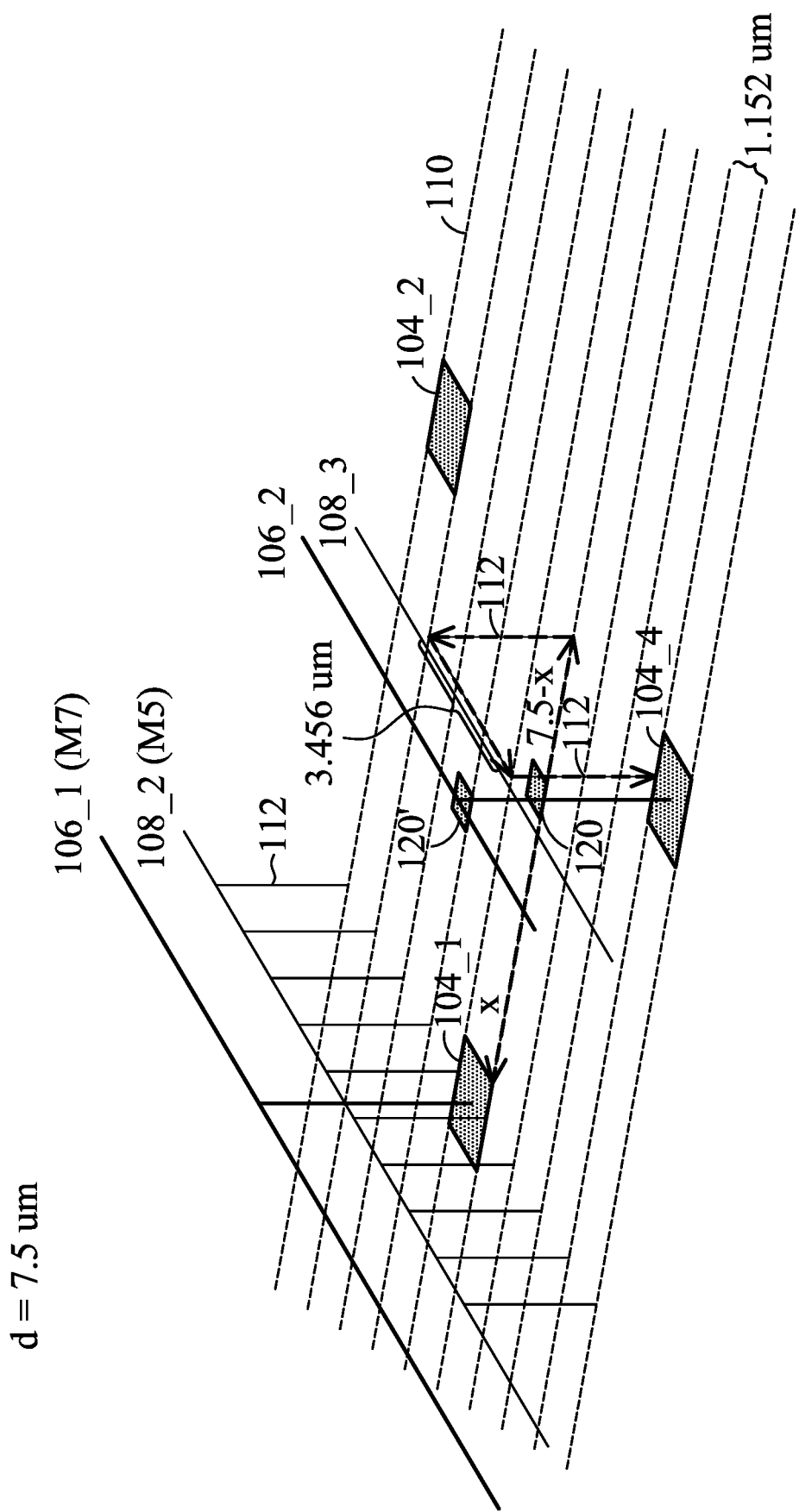
FIGS. 7A and 7B illustrate a schematic diagram of a portion of the power network, in accordance with some embodiments of the present disclosure.
Figure 7B:
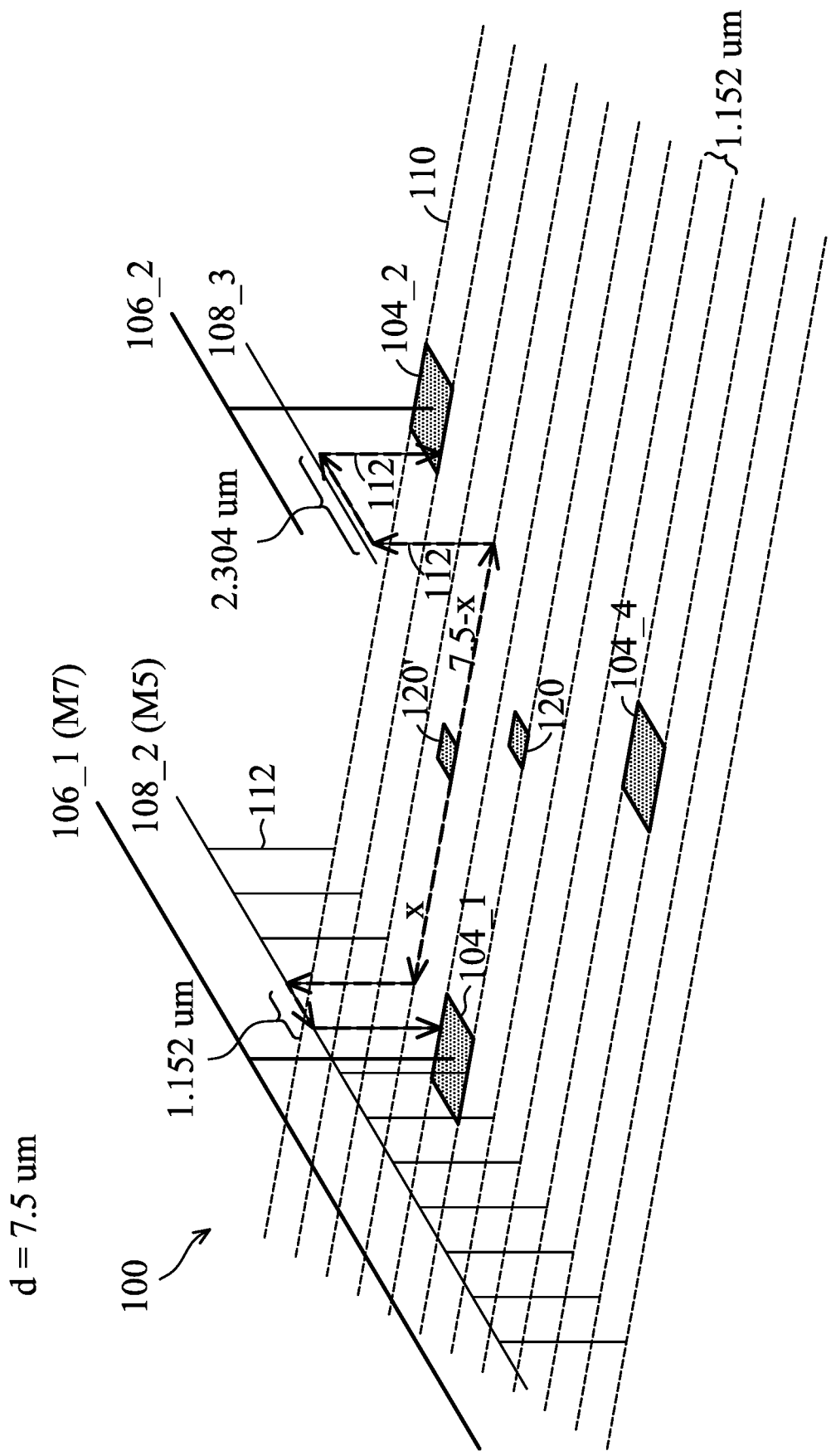

FIGS. 7A and 7B illustrate a schematic diagram of a power network in which "d" is 7.5 μm, in accordance with some embodiments of the present disclosure. In this embodiment, as discussed above, if the area of the single rhombus is 69.12 μm², the vertical axis space of the rhombus is 9.216 μm according to the formula of the rhombus area Z=the vertical axis space×d. This vertical axis space (9.216 μm) is equal to eight times the space of adjacent two second connecting lines 110 (8×1.152 μm). In this embodiment, the standard cells 120 and 120' are discussed.

As shown in FIG. 7A, the two power switch units 104_1 and 104_4 are adjacent to the standard cell 120. The resistance from the standard cell 120 to the power switch unit 104_1 is R1, and the resistance from the standard cell 120 to the power switch unit 104_4 is R2, wherein:

$$R1 = ax$$

is the resistance from the standard cell 120 through the left connecting line 110 to the power switch unit 104_1;

$$R2=(7.5-x)a+3.456b+2c$$

is the resistance from the standard cell 120 through the right second connecting line 110, one third connecting line 112, the first connecting line 108_3, and the other third connecting line 112 to the power switch unit 104_4;
 wherein:
  "a" is the sheet resistance of the second connecting lines 110,
  "b" is the sheet resistance of the first connecting lines 108, and
  "c" is the resistance of the third connecting line 112.
 When R1=R2, that is, when ax=(7.5−x)a+3.456b+2c, the maximum circuit resistance (Rmax) is:

$$Rmax=3.75a+1.728b+c$$

As shown in FIG. 7B, the two power switch units 104_1 and 104_2 are adjacent to the standard cell 120'. The resistance from the standard cell 120' to the power switch unit 104_1 is R1, and the resistance from the standard cell 120' to the power switch unit 104_2 is R2, wherein:

$$R1=ax+1.152b+2c$$

is the resistance from the standard cell 120' through the left second connecting line 110, one third connecting line 112, the first connecting line 1082, and the other third connecting line 112 to the power switch unit 104_1;

$$R2=(7.5-x)a+2.304b+2c$$

is the resistance from the standard cell 120' through the right second connecting line 110, one third connecting line 112, the first connecting line 108_3, and the other third connecting line 112 to the power switch unit 104_2;
 wherein:
  "a" is the sheet resistance of the second connecting lines 110,
  "b" is the sheet resistance of the first connecting lines 108, and
  "c" is the resistance of the third connecting line 112.
 When R1=R2, that is, when ax+1.152b+2c=(7.5−x)a+2.304b+2c, the maximum circuit resistance (Rmax) is:

$$Rmax=3.75a+1.728b+2c$$

It should be noted that standard cells 120 and 120' have different maximum circuit resistances:

$$Rmax(120)=3.75a+1.728b+c$$

$$Rmax(120')=3.75a+1.728b+2c$$

Rmax (120') has one more connecting line resistance "c" than Rmax (120). In this embodiment, only the largest maximum circuit resistance is considered. Therefore, the maximum circuit resistance in a rhombus having a "d" of 7.5 μm is 3.75a+1.728b+2c.

Figure 8A:
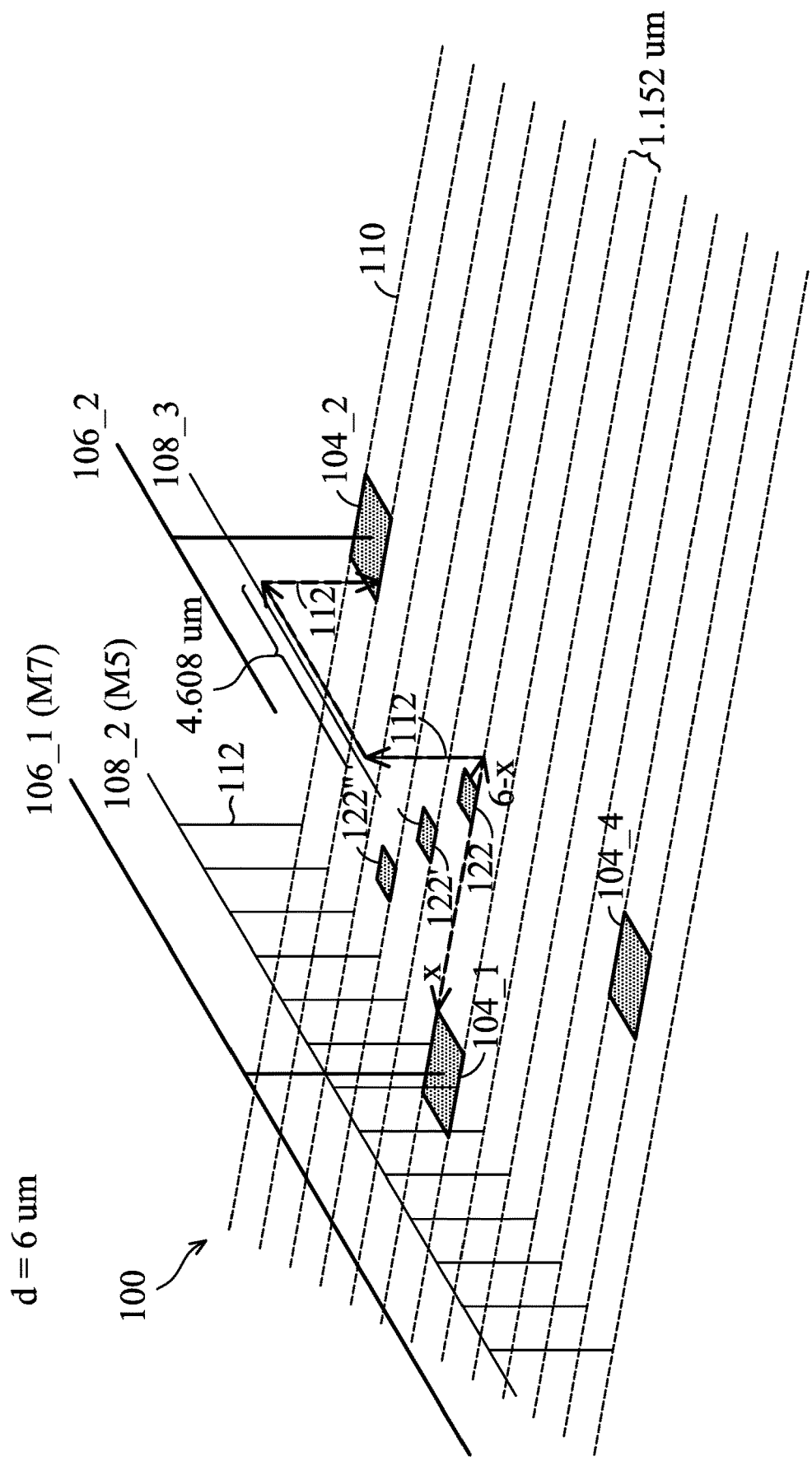
FIGS. 8A, 8B, and 8C illustrate a schematic diagram of a portion of the power network, in accordance with some embodiments of the present disclosure.
Figure 8B:
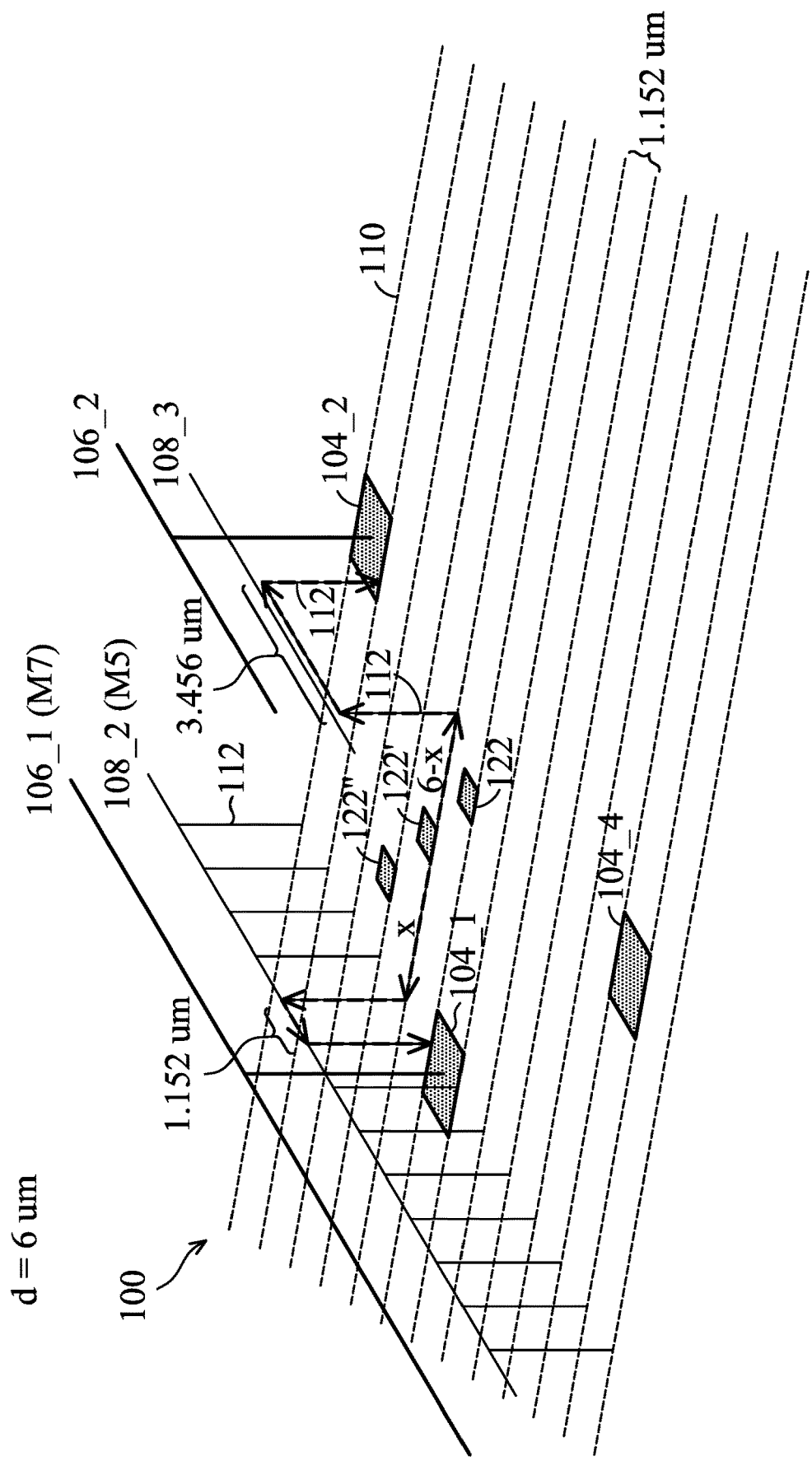
Figure 8C:
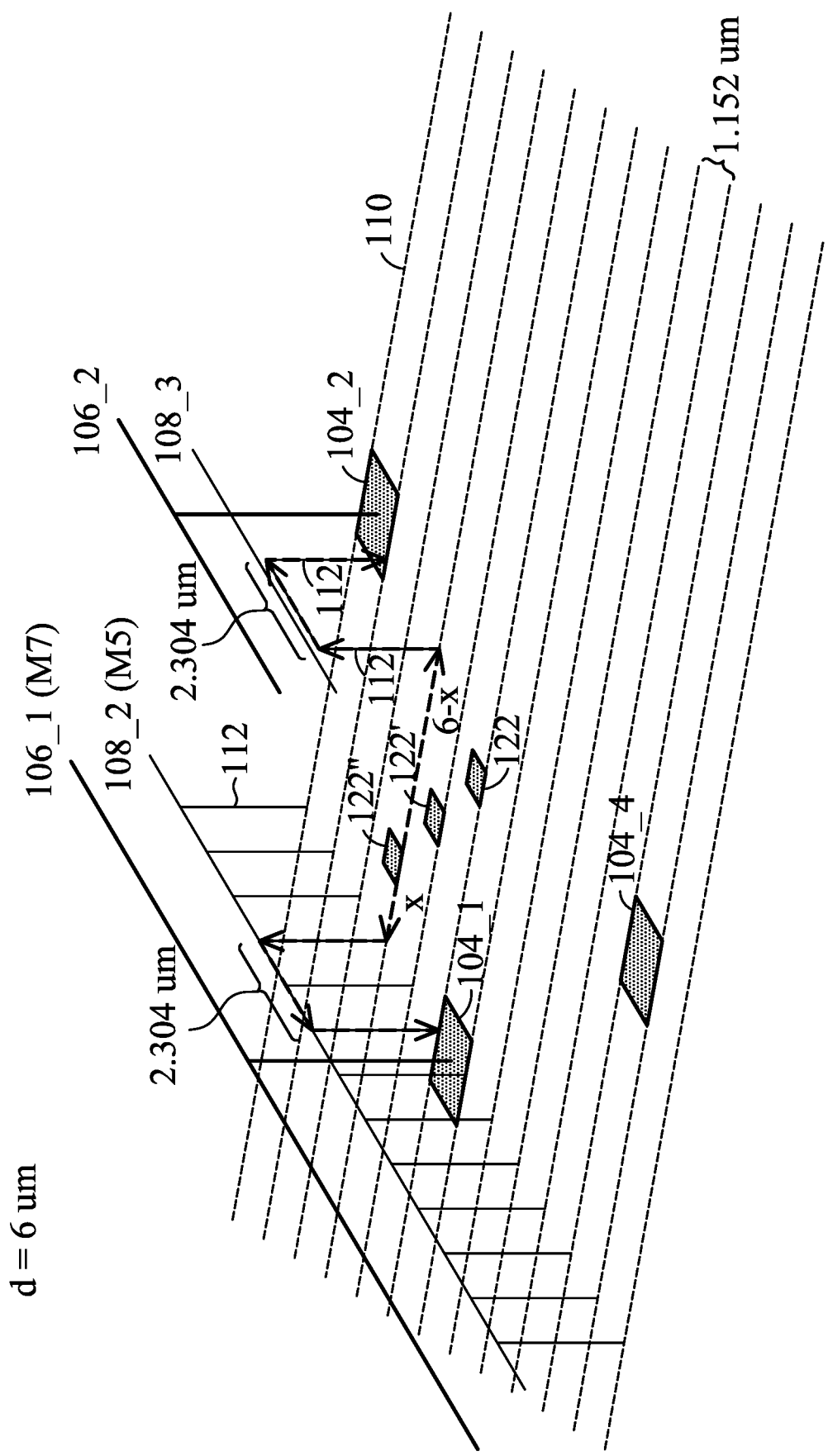

FIGS. 8A, 8B, and 8C illustrate a schematic diagram of a power network in which "d" is 6 μm, in accordance with some embodiments of the present disclosure. In this embodiment, as discussed above, if the area of the single rhombus is 69.12 μm$^2$, the vertical axis space of the rhombus is 11.52 μm according to the formula of the rhombus area Z=the vertical axis space×d. This vertical axis space (11.52 μm) is equal to ten times the space of adjacent two second connecting lines 110 (10×1.152 μm). In this embodiment, the standard cells 122, 122', and 122" are discussed.

As shown in FIG. 8A, the two power switch units 104_1 and 104_5 are adjacent to the standard cell 122. The resistance from the standard cell 122 to the power switch unit 104_1 is R1, and the resistance from the standard cell 122 to the power switch unit 104_2 is R2, wherein:

$$R1=ax$$

is the resistance from the standard cell 122 through the left connecting line 110 to the power switch unit 104_1;

$$R2=(6-x)a+4.608b+2c$$

is the resistance from the standard cell 122 through the right second connecting line 110, one third connecting line 112, the first connecting line 108_3, and the other third connecting line 112 to the power switch unit 104_2;
 wherein:
  "a" is the sheet resistance of the second connecting lines 110,
  "b" is the sheet resistance of the first connecting lines 108, and
  "c" is the resistance of the third connecting line 112.
 When R1=R2, that is, when ax=(6−x)a+4.608b+2c, the maximum circuit resistance (Rmax) is:

$$Rmax=3a+2.304b+c$$

As shown in FIG. 8B, the two power switch units 104_1 and 104_2 are adjacent to the standard cell 122'. The resistance from the standard cell 122' to the power switch unit 104_1 is R1, and the resistance from the standard cell 122' to the power switch unit 104_2 is R2, wherein:

$$R1=ax+1.152b+2c$$

is the resistance from the standard cell 122' through the left second connecting line 110, one third connecting line 112, the first connecting line 1082, and the other third connecting line 112 to the power switch unit 104_1;

$$R2=(6-x)a+3.456b+2c$$

is the resistance from the standard cell 122' through the right second connecting line 110, one third connecting line 112, the first connecting line 108_3, and the other third connecting line 112 to the power switch unit 104_2;
 wherein:
  "a" is the sheet resistance of the second connecting lines 110,
  "b" is the sheet resistance of the first connecting lines 108, and
  "c" is the resistance of the third connecting line 112.
 When R1=R2, that is, when ax+1.152b+2c=(6−x)a+3.456b+2c, the maximum circuit resistance (Rmax) is:

$$Rmax=3a+2.304b+2c$$

As shown in FIG. 8C, the two power switch units 104_1 and 104_2 are adjacent to the standard cell 122". The resistance from the standard cell 122" to the power switch unit 104_1 is R1, and the resistance from the standard cell 122" to the power switch unit 104_2 is R2, wherein:

$$R1=ax+2.304b+2c$$

is the resistance from the standard cell 122" through the left second connecting line 110, one third connecting line 112, the first connecting line 1082, and the other third connecting line 112 to the power switch unit 104_1;

$$R2=(6-x)a+2.304b+2c$$

is the resistance from the standard cell 122" through the right second connecting line 110, one third connecting line 112, the first connecting line 108_3, and the other third connecting line 112 to the power switch unit 104_2;

wherein:
"a" is the sheet resistance of the second connecting lines 110,
"b" is the sheet resistance of the first connecting lines 108, and
"c" is the resistance of the third connecting line 112.

When R1=R2, that is, when ax+2.304b+2c=(6−x)a+2.304b+2c, the maximum circuit resistance (Rmax) is:

$$R\max=3a+2.304b+2c$$

For the same reason, in this embodiment, only the largest maximum circuit resistance is considered. Therefore, the maximum circuit resistance in a rhombus having a "d" of 6 μm is 3a+2.304b+2c.

Next, the maximum circuit resistances of the above three embodiments with different values of "d" are obtained:

$$R\max(d=15)=7.5a+0.576b+c$$

$$R\max(d=7.5)=3.75a+1.728b+2c$$

$$R\max(d=6)=3a+2.304b+2c$$

It should be noted that in the above results of the maximum circuit resistance, the maximum circuit resistance of the rhombus in which "d" is 15 μm has only one "c". This is related to the position of the standard cell in the rhombus. Specifically, when the second connecting line 110 connected to the standard unit overlaps the horizontal axis of the rhombus (i.e., the standard unit is positioned on the horizontal axis of the rhombus), the maximum circuit resistance of the standard cell to the power switch unit is only required to pass through one of the third connecting lines 112. When the second connecting line 110 connected to the standard unit is parallel to the horizontal axis of the rhombus (i.e., the standard unit is not positioned on the horizontal axis of the rhombus), the maximum circuit resistance of the standard cell to the power switch unit is required to pass through two of the third connecting lines 112.

Based on the sheet resistance "b" of the first connecting line 108, the sheet resistance "a" of the second connecting line 110, and the resistance "c" of the third connecting line 112, the values of the above three maximum circuit resistances can be obtained and the smallest maximum circuit resistance can be found. For example, if "a", "b", and "c" are "1", "1", and "1", the values of the above three maximum circuit resistances of the three embodiments is:

$$R\max(d=15)=9.076$$

$$R\max(d=7.5)=7.478$$

$$R\max(d=6)=7.304$$

The rhombus in which "d" is 6 μm has the smallest maximum circuit resistance. Therefore, when "a", "b", and "c" are "1", "1", and "1", the rhombus in which "d" is 6 μm is the optimal rhombus (the target rhombus) of the above three embodiments and the circuit path in this rhombus ("d" is 6 μm) has the smallest (optimal) IR-drop.

According to the embodiment as discussed above, considering the variable of "d", it can be derived that:

$$R\max(d)=(d/2)a+(34.56/2d-0.576)b+2c$$

wherein:
"d" is the half of the horizontal axis space of the rhombus.
"a" is the sheet resistance of the second connecting lines 110,
"b" is the sheet resistance of the first connecting lines 108, and
"c" is the resistance of the third connecting line 112.

With the above formula, the smallest (minimum) solution of Rmax(d) can be derived:

when $d=(34.56b/a)^{1/2}$, $$R\max(\min)=[(34.56b/a)^{1/2}]a-0.576b+2c.$$

Considering the different utilization rate of power switch units, there will be different half of the rhombus area "A" and the different width "B" of the different power switch units (i.e., the space between the two adjacent second connecting lines 110), the formula (1) discussed above can be derived:

$$d=(Ab/a)^{1/2} \qquad \text{formula (1)}$$

$$R\max(\min)=[(Ab/a)^{1/2}]a-Bb/2+2c$$

wherein:
"A" is half of the area of the rhombus,
"B" is the space between the two adjacent second connecting lines 110,
"a" is the sheet resistance of the second connecting lines 110,
"b" is the sheet resistance of the first connecting lines 108, and
"d" is half of the horizontal axis space of the rhombus.

In some embodiments, formula (1) can also be expressed with the horizontal axis space of the rhombus:

$$X=2(Zb/2a)^{1/2}$$

where: "Z" is the area of the rhombus,
"a" is the sheet resistance of the second connecting lines 110,
"b" is the sheet resistance of the first connecting lines 108, and
"X" is the horizontal axis space of the rhombus.

As discussed above, according to the area of the rhombus obtained by the utilization rate of the power switch unit, the sheet resistance "b" of the first connecting lines 108 and the sheet resistance "a" of the second connecting lines 110 obtained by the metal material, the horizontal axis space "X" of the rhombus can be obtained by the formula (1) such that there is the smallest (optimal) IR-drop from the standard cell to the power switch unit in the rhombus (it is also called as the target rhombus).

Figure 9:
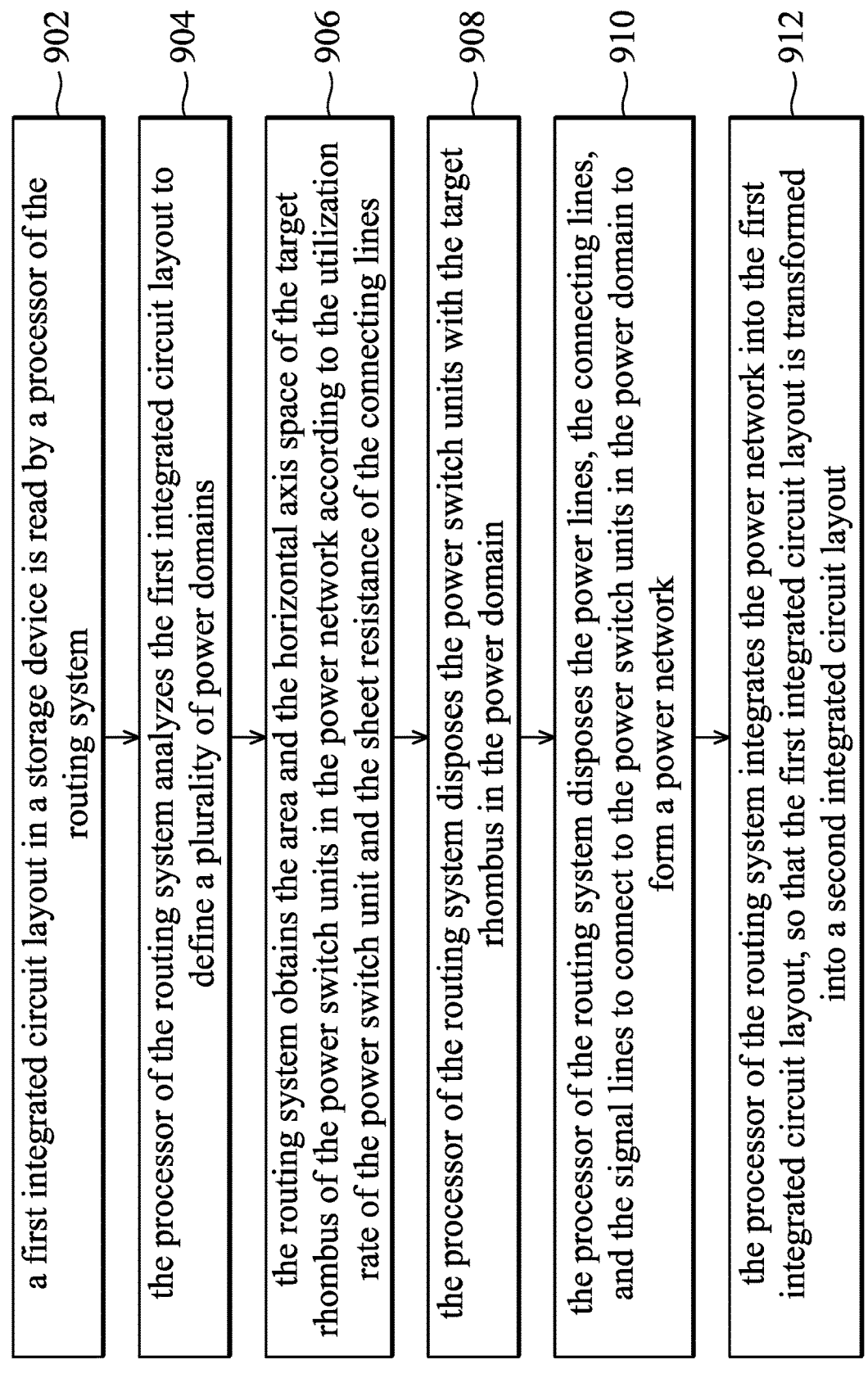
FIG. 9 illustrates a flowchart of the method of routing the power network, in accordance with some embodiments of the present disclosure.

FIG. 9 illustrates a flowchart of the method 900 for routing the power network, in accordance with some embodiments of the present disclosure. The method 900 is merely an example, and is not intended to limit the present disclosure beyond what is explicitly recited in the claims. Additional operations can be provided before, during, and after the method 900, and some operations described can be replaced, eliminated, or moved around for additional embodiments of the method. The method 900 is briefly discussed below.

In operation 902, a first integrated circuit layout in a storage device is read by a processor of the routing system. For example, the processor 264 of routing system 260 in the design house 220 reads the integrated circuit layout 222 in the storage device 262.

In operation 904, the processor of the routing system analyzes the first integrated circuit layout to define a plurality of power domains. For example, the processor 264 of the routing system 260 analyzes the integrated circuit layout 222 to define a plurality of power domains 102.

In operation 906, the routing system obtains the area and the horizontal axis space of the target rhombus of the power switch units in the power network according to the utilization rate of the power switch units and the sheet resistance of the connecting lines. In the present embodiments, the area of the target rhombus of the power switch units and the sheet resistance of the connecting lines in the power network are substituted into the formula (1) $d=(Ab/a)^{1/2}$ to obtain (calculate) the horizontal axis space of the target rhombus, where the area of the target rhombus is obtained based on the utilization rate of the power switch unit, and "A" is half of the area of the rhombus, "a" is the sheet resistance of the second connecting lines 110, "b" is the sheet resistance of the first connecting lines 108, and "d" is half of the horizontal axis space of the rhombus.

In operation 908, the processor of the routing system disposes the power switch units with the target rhombus in the power domain. For example, the processor 264 disposes the power switch unit 104s with the target rhombus in power domain 102, as shown in FIG. 1B.

In operation 910, the processor of the routing system disposes the power lines, the connecting lines, and the signal lines to connect to the power switch units in the power domain to form a power network. For example, the processor 264 of the routing system 260 disposes the first power lines 106, the first connecting lines 108, the second connecting lines 110, and the signal lines connect to the power switch units 104 in the power domain 102 to form the power network 100, as shown in FIG. 1C. It should be noted that the relative features of the power network 100 are as described above, which is not described in detail herein.

In operation 912, the processor of the routing system integrates the power network into the first integrated circuit layout, so that the first integrated circuit layout is transformed into a second integrated circuit layout. For example, the processor 264 of the routing system 260 integrates the power network 100 into the integrated circuit layout 222, so that the integrated circuit layout 222 is transformed into the integrated circuit layout 270 for subsequent processes. In some embodiments, the integrated circuit layout 270 is transmitted to the mask house 230 via the communication module 268 to produce the masks such that the IC manufacturer 240 can fabricate the IC device 250 by using the produced masks.

The embodiments of the present disclosure offer advantages over existing art, though it should be understood that other embodiments may offer different advantages, not all advantages are necessarily discussed herein, and that no particular advantage is required for all embodiments. By utilizing the embodiments of the present disclosure, a power network can be fabricated with the smallest (optimal) IR-drop from the standard cell to the power switch unit in the power network.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for routing a power network, comprising:
   reading a first integrated circuit layout in a storage device by a processor;
   analyzing the first integrated circuit layout by the processor to define a power domain;
   disposing a plurality of power switch units in a first semiconductor layer of the power domain, wherein the plurality of power switch units are arranged in a plurality of columns along a first direction and a plurality of rows along a second direction;
   wherein the plurality of power switch units in one row each aligns with a center point of a horizontal space between adjacent two of the plurality of power switch units in adjacent row in the first direction;
   wherein the plurality of power switch units in one column each aligns with a center point of a vertical space between adjacent two of the plurality of power switch units in adjacent column in the second direction;
   disposing a plurality of second connecting lines extending in the second direction in a fourth semiconductor layer of the power domain by the processor according to the plurality of power switch units, wherein the plurality of second connecting lines are separated by a width of one of the plurality of power switch units in the first direction; and
   wherein an upper edge and a lower edge of one of the plurality of power switch units are connected to adjacent two of the plurality of second connecting lines, respectively.

2. The method as claimed in claim 1, further comprising:
   disposing a plurality of first power lines and a plurality of second power lines in a second semiconductor layer of the power domain by the processor according to the plurality of power switch units;
   wherein the first power lines extend along the first direction, one of the plurality of first power lines crossing over one column of the plurality of power switch units; and
   wherein the plurality of second power lines extend along the first direction, the plurality of second power lines being respectively separated from and parallel to the plurality of first power lines.

3. The method as claimed in claim 2, further comprising:
   disposing a plurality of first connecting lines in a third semiconductor layer of the power domain by the processor according to the plurality of power switch units; and
   wherein adjacent two of the plurality of first connecting lines cross over one column of the plurality of power switch units and are respectively positioned on two sides of one of the plurality of first power lines, wherein the plurality of first connecting lines are parallel to the plurality of first power lines.

4. The method as claimed in claim 3, further comprising:
   connecting the plurality of power switch units to the plurality of first power lines, the plurality of second power lines, and the plurality of first connecting lines through a plurality of third connecting lines.

5. The method as claimed in claim 1, wherein the first semiconductor layer is the fourth semiconductor layer.

6. The method as claimed in claim 1, further comprising:
   disposing a plurality of standard cells in the fourth semiconductor layer by the processor according to the plurality of second connecting lines, wherein each of the plurality of standard cells connects to one of the plurality of second connecting lines.

7. The method as claimed in claim 1, further comprising:
integrating the power network into the first integrated circuit layout by the processor, so that the first integrated circuit layout is transformed into a second integrated circuit layout.

8. The method as claimed in claim 3, wherein the step of disposing the power switch units in the power domain further comprising:
determining an area of a rhombus by the processor according to a utilization rate of the plurality of power switch units, wherein the rhombus is defined by four of the plurality of power switch units;
calculating the horizontal axis space of the rhombus by the processor according to the sheet resistance of the plurality of first connecting lines, the sheet resistance of the plurality of second connecting lines, and the area of the rhombus; and
disposing the plurality of power switch units in the power domain by the processor according to the area of the rhombus and the horizontal axis space of the rhombus.

9. The method as claimed in claim 8, wherein the horizontal axis space of the rhombus is obtained using a formula, wherein the formula is:

$d = (-Ab/a)^{1/2}$, wherein "A" is half of the area of the rhombus, "a" is the sheet resistance of the plurality of second connecting lines, "b" is the sheet resistance of the plurality of first connecting lines, and "d" is half of the horizontal axis space of the rhombus.

\* \* \* \* \*